(12) United States Patent
Kojima et al.

(10) Patent No.: US 12,429,448 B2
(45) Date of Patent: Sep. 30, 2025

(54) REFERENCE ELECTRODE, ELECTRODE, AND SENSOR INCLUDING THESE

(71) Applicant: SYSMEX CORPORATION, Kobe (JP)

(72) Inventors: Junko Kojima, Kobe (JP); Kenichi Uchiyama, Kobe (JP); Sayaka Hongo, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 241 days.

(21) Appl. No.: 18/173,165

(22) Filed: Feb. 23, 2023

(65) Prior Publication Data

US 2023/0273142 A1 Aug. 31, 2023

(30) Foreign Application Priority Data

Feb. 28, 2022 (JP) .................................. 2022-029599

(51) Int. Cl.
*G01N 27/30* (2006.01)
*G01N 27/327* (2006.01)
*G01N 27/406* (2006.01)

(52) U.S. Cl.
CPC ....... *G01N 27/301* (2013.01); *G01N 27/3277* (2013.01); *G01N 27/406* (2013.01)

(58) Field of Classification Search
CPC ............ G01N 27/301; G01N 27/3277; G01N 27/406; G01N 27/307; G01N 27/30; G01N 27/416
See application file for complete search history.

(56) References Cited

U.S. PATENT DOCUMENTS

| | | | | |
|---|---|---|---|---|
| 5,037,527 A | * | 8/1991 | Hayashi | G01N 27/301 204/403.12 |
| 8,211,283 B2 | | 7/2012 | Kendig et al. | |
| 2009/0283404 A1 | * | 11/2009 | Kakiuchi | G01N 27/401 204/435 |
| 2010/0160756 A1 | * | 6/2010 | Petisce | A61B 5/14542 600/345 |
| 2013/0153417 A1 | * | 6/2013 | Shibata | G01N 27/301 204/414 |
| 2018/0128770 A1 | * | 5/2018 | Lindner | C08J 5/18 |
| 2019/0252706 A1 | * | 8/2019 | Norby | C01B 13/0255 |

(Continued)

FOREIGN PATENT DOCUMENTS

EP 4 089 406 A1 11/2022
JP 2007-064971 A 3/2007
(Continued)

OTHER PUBLICATIONS

Wang et al., All-solid-state blood calcium sensors based on screen-printed poly(3,4-ethylenedioxythiophene) as the solid contact, Sensors and Actuators B, 2012, 173, 630-635 (Year: 2012).*

(Continued)

*Primary Examiner* — Luan V Van
*Assistant Examiner* — Shizhi Qian
(74) *Attorney, Agent, or Firm* — METROLEX IP LAW GROUP, PLLC; Robert L. Scott, Esq.

(57) ABSTRACT

Disclosed is a reference electrode comprising: an ionic-liquid-containing membrane; and a hydrophilic membrane disposed on the ionic-liquid-containing membrane.

19 Claims, 13 Drawing Sheets

(56) References Cited

U.S. PATENT DOCUMENTS

| | | | | |
|---|---|---|---|---|
| 2020/0116664 A1* | 4/2020 | Abeyrathne | ......... | G01N 27/301 |
| 2024/0183817 A1* | 6/2024 | Cooley | ................ | G01N 27/301 |

FOREIGN PATENT DOCUMENTS

| | | | |
|---|---|---|---|
| JP | 4733588 | B2 | 7/2011 |
| JP | 5036003 | B2 | 9/2012 |
| JP | 5572016 | B2 | 8/2014 |
| JP | 2017530371 | A | 10/2017 |
| JP | 2023007958 | A | 1/2023 |
| WO | 2012/026514 | A1 | 3/2012 |
| WO | 2021140933 | A1 | 7/2021 |

OTHER PUBLICATIONS

Park et al., Hydrophilic polyvinyl alcohol coating on hydrophobic electrospun nanofiber membrane for high performance thin film composite forward osmosis membrane, Desalination, 2018, 426, 50-59 (Year: 2018).*

Tisch_CA, Cellulose Acetate Filters: Characteristics, Benefits, and Common Applications, https://support/scientificfilters.com/filter-media/cellulose-acetate/, 2025 (Year: 2025).*

Benahmed et al., Cellulose Acetate-g-Polycaprolactone Copolymerization Using Diisocyanate Intermediates and the Effect of Polymer Chain Length on Surface, Thermal, and Antibacterial Properties, Molecules, 2022, 27, 1408 (Year: 2022).*

Wiki_PVA, Polyvinyl alcohol, https://en.wikipedia.org/wiki/Polyvinyl_alcohol, 2025 (Year: 2025).*

Alva et al., Development of integrated planar chloride ion-selective electrode and Ag/AgCl reference electrode based on chitosan/cellulose acetate membrane for blood serum analysis, Analytical & Bioanalytical Electrochemistry, 2019, 11, 1669-1686 (Year: 2019 ).*

Sadeghi et al., Investigating the effect of chitosan on hydrophilicity and bioactivity of conductive electrospun composite scaffold for neural tissue engineering, International Journal of Biological Macromolecules, 2019, 121, 625-632 (Year: 2019).*

Kojima et al., Influence of solid electrolyte upon the repeatability and reproducibity of all-solid-state ion-selective electrodes with inorganic insertion material paste, Electrochimica Acta, 2021, 373, 137896, available online Feb. 3, 2021 (Year: 2021).*

Chen et al., Reference electrodes based on ionic liquid-doped reference membranes with biocompatible silicone matrixes, ACS Sensors, 2020, 5, 1717-1725 (Year: 2020).*

Extended European Search Report issued Jul. 11, 2023, by the European Patent Office in corresponding European Patent Application No. 23158504.3. (6 pages).

Horiba, Ltd.: "Brochure for product 'Pure IL 9600-10D'", Retrieved from https://static.horiba.com/fileadmin/Horiba/Water_Quality/03_Application/Pharmacy/PUREIL.pdf, date unknown, and an English translation thereof. (4 pages).

Kojima, "Application of a novel ionic-liquid-based membrane reference electrode with inorganic insertion material paste to a calibration-free all-solid-state ion sensor chip", Sensors and Actuators: B. Chemical, Elsevier B.V., 2021, vol. 347, Art. No. 130625, 8 pgs.

Kojima, "Influence of solid electrolyte upon the repeatability and reproducibility of all-solid- state ion-selective electrodes with inorganic insertion material paste", Electrochimica Acta, Elsevier Ltd., 2021, vol. 373, Art. No. 137896, 7 pgs.

Communication pursuant to Article 94 (3) EPC issued on Jun. 17, 2025 in a counterpart European patent application No. 23158504.3.

* cited by examiner

REFERENCE ELECTRODE, ELECTRODE, AND SENSOR INCLUDING THESE

CROSS REFERENCE TO RELATED APPLICATIONS

This application claims priority from prior Japanese Patent Application No. 2022-029599, filed on Feb. 28, 2022, entitled "REFERENCE ELECTRODE, ELECTRODE, AND SENSOR INCLUDING THESE", the entire content of which is incorporated herein by reference.

FIELD OF THE INVENTION

The present invention relates to a reference electrode, an electrode, and a sensor including these.

BACKGROUND OF THE INVENTION

An electrochemical sensor includes, in addition to a working electrode, a reference electrode serving as reference for measuring the potential of the working electrode. A conventionally-used reference electrode is, for example, an electrode in which: an electrode material made from Ag/AgCl is immersed in an internal solution that is a high-concentration KCl solution; and the electrode material and the internal solution are accommodated in an accommodating body having a liquid junction made from ceramic, glass, or the like.

In general, in a reference electrode such as one described above, the internal solution is in contact with a specimen solution through the liquid junction. In such a reference electrode, $K^+$ and $Cl^-$ constantly continue to move to the specimen solution side owing to a concentration gradient or the like. Consequently, problems arise in that: the specimen solution is contaminated; the liquid junction is clogged; and it becomes necessary to replenish or replace the internal solution. As a means for solving such problems, for example, Japanese Patent No. 4733588 discloses a reference electrode including: an internal electrode; an internal solution in contact with the internal electrode; and a liquid junction contiguous to the internal solution. In the reference electrode, an ionic liquid made into a gel is used for the liquid junction.

In addition, a solid-type reference electrode has been developed for the purpose of, for example, downsizing an internal-solution-type reference electrode such as one described above or configuring the internal-solution-type reference electrode to be disposable. For example, International Publication WO2021/140933 discloses an electrode including: an internal solid layer containing a metal oxide and a solid electrolyte; and an electrode material.

In an electrochemical sensor, the electrode potential of a reference electrode is desirably fixed regardless of the type of a specimen being tested or the concentration of an analyte and/or another component. In particular, a biological specimen such as serum contains various components including proteins, and thus it has been required to provide a reference electrode that has a stable electrode potential without being influenced by such components even at the time of measurement of a biological specimen.

The present inventors found that, in the above Japanese Patent No. 4733588 and International Publication WO2021/140933 in each of which an ionic liquid is used, the potential varies owing to influence of albumin inside a biological specimen.

SUMMARY OF THE INVENTION

The scope of the present invention is defined solely by the appended claims, and is not affected to any degree by the statements within this summary.

A reference electrode according to one embodiment of the present invention includes: an ionic-liquid-containing membrane; and a hydrophilic membrane disposed on the ionic-liquid-containing membrane.

A sensor according to an embodiment of the present invention includes: an insulation substrate; and a first electrode and a second electrode disposed on the insulation substrate, wherein the first electrode includes an ionic-liquid-containing membrane and a hydrophilic membrane disposed on the ionic-liquid-containing membrane.

An electrode according to an embodiment of the present invention is an electrode configured to detect or measure albumin inside a specimen solution, the electrode including an ionic-liquid-containing membrane.

DETAILED DESCRIPTION

Figure 1:
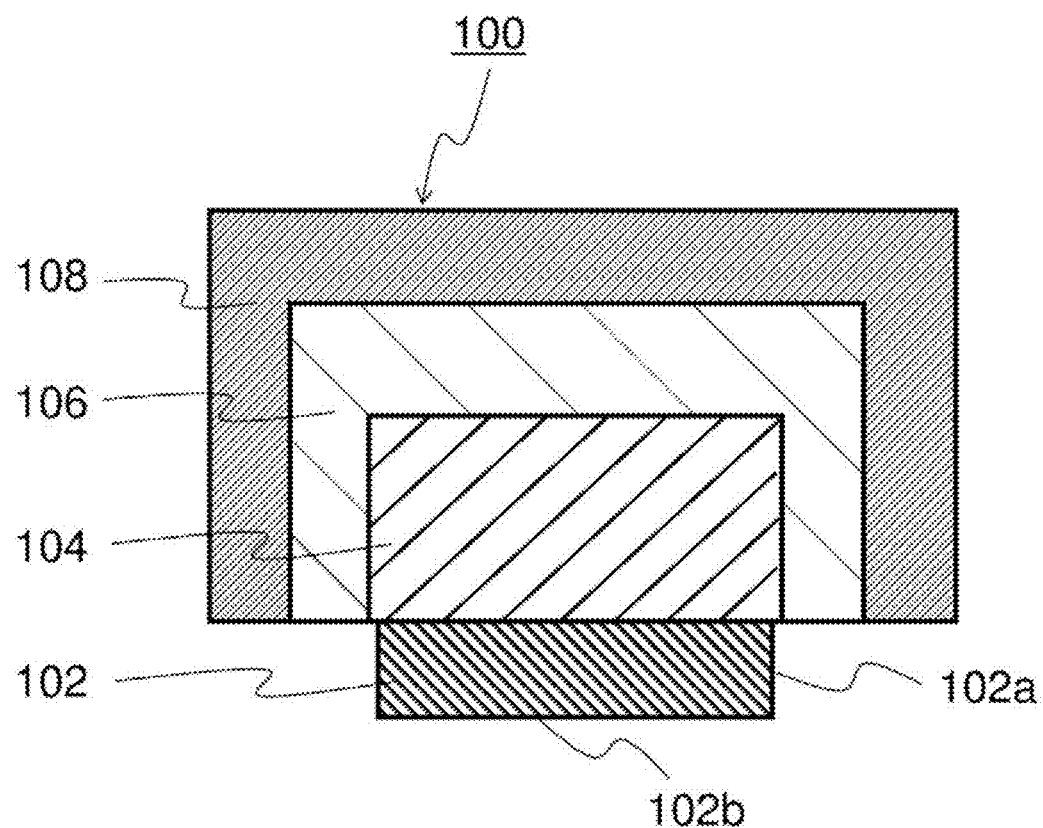
FIG. 1 is a schematic cross-sectional view of a reference electrode according to an embodiment of the present invention.

Hereinafter, an embodiment for carrying out the present disclosure (hereinafter, referred to as "the present embodiment") will be described in detail with reference to the drawings. However, the present disclosure is not limited thereto, and various modifications can be made without departing from the gist of the present disclosure. In the following description for the drawings, the same or similar components are denoted by the same or similar reference characters. The drawings are schematic, and dimensions, proportions, and the like therein do not necessarily match the actual ones. The relationships and proportions between dimensions may be different among the drawings.

First Embodiment: Solid-Type Reference Electrode

FIG. 1 is a schematic cross-sectional view of a reference electrode according to the present embodiment. As shown in FIG. 1, a reference electrode 100 according to the present embodiment includes: an internal electrode 102; an internal solid layer 104 disposed on the internal electrode 102; an ionic-liquid-containing membrane 106 disposed on the internal solid layer 104; and a hydrophilic membrane 108 disposed on the ionic-liquid-containing membrane 106. The reference electrode 100 is a solid-type reference electrode that does not need to have, as a constituent, a liquid-form (i.e., fluidic) internal solution.

In the present specification, the reference electrode refers to an electrode used for, at the time of measuring an electrode potential, providing a reference for the potential. The reference electrode is used in a sensor or an electrochemical cell in a state of being electrically connected to a working electrode, and the potential difference between the reference electrode and the working electrode is outputted as the electrode potential of the working electrode. Typically, usage is made such that current hardly flows to the reference electrode. In general, a reference electrode is required to be such that: an electrode reaction therein is reversible; and variation in electrode potential during usage is small.

Since the reference electrode 100 has the above configuration (in particular, since the reference electrode 100 includes the ionic-liquid-containing membrane 106 and the hydrophilic membrane 108), the reference electrode 100 has a stable electrode potential even at the time of measurement of a biological specimen. Hereinafter, each of the constituents will be described in detail.

(Internal Electrode)

The internal electrode 102 is a member having electrical conductivity and is a member for electrically connecting the internal solid layer 104 to a desired member such as the working electrode.

The internal electrode 102 is, for example, an electrode containing an electrically-conductive material. The electrically-conductive material is not particularly limited, and examples thereof include: metals such as platinum, gold, silver, copper, carbon, palladium, chromium, aluminum, and nickel; alloys each containing at least one of these metals; and halides of these metals. The electrically-conductive material is preferably at least one of platinum, gold, silver, palladium, aluminum, nickel, and carbon. These electrically-conductive materials may be used singly, or two or more of them may be used in combination.

In the above aspect, the electrically-conductive material content of the internal electrode 102 is, for example, 70 to 100% by mass (inclusive; the same applies throughout the present specification unless otherwise specified), preferably 85 to 100% by mass, and more preferably 95 to 100% by mass with respect to the total mass of the internal electrode. The phrase "the electrically-conductive material content is 100% by mass" means that the internal electrode 102 consists of the electrically-conductive material.

In FIG. 1, the internal electrode 102 is illustrated as a single layer. However, the internal electrode 102 may have a single layer structure composed of a single composition or may have a multi-layer structure including two or more layers that have compositions different from one another.

The average thickness of the internal electrode 102 is not particularly limited unless the electrical conductivity thereof is significantly impaired. This average thickness is, for example, 1 to 10 μm and preferably 1 to 5 μm. If the internal electrode 102 has an average thickness that is within the above range, manufacturing efficiency, manufacturing cost, and the like tend to be improved. The average thickness of each constituent of the electrode in the present specification has been measured through observation of a cross section of the electrode by using a scanning electron microscope or an optical microscope or has been measured using a stylus-type surface shape measurement machine, a step profiler, or a laser displacement meter.

Alternatively, the reference electrode 100 does not have to be provided with the internal electrode 102, and the internal solid layer 104 may be directly connected to a desired member such as the working electrode. In the embodiment shown in FIG. 1, the internal solid layer 104 is directly disposed on the internal electrode 102.

The reference electrode 100 may be configured such that a side surface of the internal electrode 102 is covered with another material so as not to expose the side surface of the internal electrode 102. A side surface 102a of the internal electrode 102 may be coated with a coating member having insulating properties, or a configuration may be employed in which the internal electrode 102 is embedded in the internal solid layer 104 so that only a bottom surface 102b of the internal electrode 102 is exposed from the internal solid layer 104.

(Internal Solid Layer)

The internal solid layer 104 is a solid-form layer containing a compound that reversibly undergoes an oxidation-reduction reaction, and the electrode potential of the reference electrode 100 is determined according to the oxidized/reduced state of the compound. Aspects of the internal solid layer 104 encompasses, in addition to an aspect in which the internal solid layer 104 consists essentially of a solid-form material, an aspect in which the internal solid layer 104 is made as a gel with a solvent having been contained in a matrix component such as a macromolecule.

From the viewpoint of causing the reference electrode 100 to have a more stable electrode potential, the internal solid layer 104 preferably conducts ions related to an oxidation-reduction reaction that occurs in the internal solid layer 104, and the internal solid layer 104 preferably has electrical conductivity. In this case, regarding the compound that reversibly undergoes an oxidation-reduction reaction, ions and electrons related to the reaction are stably supplied to and released from the compound. Consequently, the reference electrode 100 tends to have a more stable electrode potential. For example, the internal solid layer 104 may contain, in addition to the compound that reversibly undergoes an oxidation-reduction reaction, a substance that conducts ions related to the oxidation-reduction reaction and an electrically-conductive agent.

As the compound that reversibly undergoes an oxidation-reduction reaction, the internal solid layer 104 contains, for example, a metal chloride or an insertion material, and preferably contains an insertion material.

Examples of the metal chloride include silver chloride and mercury chloride. The metal chloride may be in, for example, the form of particulates or a form in which the metal chloride coats the surface of the internal electrode 102.

The insertion material refers to a material that allows metal ions to be reversibly inserted into or released from the backbone structure thereof while undergoing an oxidation-reduction reaction. The insertion material has a high reversibility for an oxidation-reduction reaction. Thus, if the internal solid layer 104 contains the insertion material, the reference electrode 100 tends to have a more stable electrode potential, and reproducibility per individual tends to become higher.

From the viewpoint of further increasing the stability of the reference electrode, the insertion material is an inorganic insertion material. The ions to be inserted into or released from the insertion material are not particularly limited, and examples of the ions include sodium ions, potassium ions, lithium ions, calcium ions, magnesium ions, and the like. Among these ions, sodium ions and potassium ions are more preferable, and sodium ions are further preferable.

Examples of the insertion material include a metal oxide, an oxygen redox material, and a Prussian blue analogue. Among these insertion materials, a metal oxide is preferable.

Examples of the metal oxide include $M_xMnO_2$, $M_xNiO_2$, $M_xCoO_2$, $M_xNi_{0.5}Mn_{0.5}O_2$, $M_xFeO_2$, $M_xFe_{1/3}Mn_{2/3}O_2$, $M_xNi_{1/3}Co_{1/3}Mn_{1/3}O_2$, $M_xNi_{0.5}Ti_{0.5}O_2$, $M_xVO_2$, $M_xCrO_2$, $M_xFePO_4$, and the like. In the above composition formulas, "M"s each independently represent Na or K, and "x"s each represent any positive number. The metal oxide is preferably $M_xMnO_2$ and more preferably $Na_xMnO_2$. If such a metal oxide is used, the reference electrode 100 tends to have a more stable electrode potential.

In the above composition formulas, each of "x"s is ordinarily a value of larger than 0 and not larger than 1. "x" is preferably 0.150 to 0.660, more preferably 0.200 to 0.500, further preferably 0.220 to 0.280, 0.300 to 0.360, or 0.410 to 0.470, and even more preferably 0.245 to 0.255, 0.325 to 0.335, or 0.435 to 0.445.

The crystal structure of the metal oxide is not particularly limited as long as the metal ions are reversibly inserted into or released from the metal oxide. Examples of the crystal structure include an orthorhombic crystal system, a tetragonal crystal system, a trigonal crystal system, a hexagonal crystal system, a cubic crystal system, a triclinic crystal system, a monoclinic crystal system, and the like. Among these crystal structures, an orthorhombic crystal system is preferable.

The oxygen redox material is a material that allows utilization of an oxidation-reduction reaction with not only transition metal ions but also oxide ions. Examples of the oxygen redox material include $Na_2Mn_3O_7$, $Na_{2/3}Mg_{0.28}Mn_{0.72}O_2$, $Na_2RuO_3$, $Na_{1.3}Nb_{0.3}Mn_{0.4}O_2$, $Na_{0.6}Li_{0.2}Mn_{0.8}O_2$, and the like.

The Prussian blue analogue is a material in which cyano groups are coordinated with transition metal ions. Examples of the Prussian blue analogue include $Na_2Mn[Fe(CN)_6]$, $Na_yCO[Fe(CN)_6]_{0.90} \cdot 2.9H_2O$ (in the formula, "y" represents any positive number), K—FeHCF (potassium iron hexacyanoferrate), K—NiHCF (potassium nickel hexacyanoferrate), K—CuHCF (potassium copper hexacyanoferrate), Na—NiHCF (sodium nickel hexacyanoferrate), Ca—NiHCF (calcium nickel hexacyanoferrate), and the like.

In the internal solid layer 104, the insertion material may be contained in any shape but is preferably contained as particles. The shape of each particle is not particularly limited and may be, for example, a scale shape, a columnar shape, a spherical shape, an ellipsoidal shape, or the like.

The above insertion materials and shapes thereof may be used singly, or two or more of them may be used in combination.

If the compound that reversibly undergoes an oxidation-reduction reaction such as the metal chloride or the insertion material is contained in the form of particulates in the internal solid layer 104, the average particle diameter of the particles is preferably 1 to 20 μm, more preferably 2 to 15 μm, and further preferably 5 to 12 μm. If the average particle diameter is within the above range, the metal chloride or the insertion material is more evenly contained in the internal solid layer 104, and furthermore, an oxidation-reduction reaction of this material is more likely to moderately occur. Consequently, the reference electrode 100 tends to have a more stable electrode potential. The above average particle diameter only has to be measured by a laser diffraction/scattering type device for measuring a distribution of particle diameters.

Regarding the compound that reversibly undergoes an oxidation-reduction reaction such as the metal chloride or the insertion material, the compound content is, for example, 20 to 70 parts by mass, preferably 25 to 65 parts by mass, and more preferably 30 to 60 parts by mass with respect to the total mass (100 parts by mass) of the internal solid layer 104. In particular, the insertion material content is, for example, 20 to 70 parts by mass, preferably 25 to 65 parts by mass, and more preferably 30 to 60 parts by mass with respect to the total mass (100 parts by mass) of the internal solid layer 104.

The internal solid layer 104 preferably further contains a substance that conducts ions related to the oxidation-reduction reaction. The ions to be conducted by the substance only have to be selected as appropriate according to the type of the above compound that reversibly undergoes the oxidation-reduction reaction such as the metal chloride or the insertion material. For example, if the internal solid layer 104 contains an insertion material, the internal solid layer 104 preferably further contains a substance that conducts metal ions to be inserted into or released from the insertion material.

Examples of the substance that conducts the metal ions include an ion-conductive ceramic. Therefore, in one preferable aspect, the internal solid layer 104 contains an insertion material and an ion-conductive ceramic that conducts metal ions to be inserted into or released from the insertion material.

Examples of the ion-conductive ceramic include potassium ion-conductive ceramic, sodium ion-conductive ceramic, lithium ion-conductive ceramic, calcium ion-conductive ceramic, magnesium ion-conductive ceramic, and the like. The ion-conductive ceramic is preferably potassium ion-conductive ceramic or sodium ion-conductive ceramic, and more preferably sodium ion-conductive ceramic.

More specific examples of the ion-conductive ceramic include: a solid electrolyte based on an oxide such as a β"-alumina, a β-alumina, a perovskite type oxide, a NASICON type oxide, or a garnet type oxide; a sulfide-based solid electrolyte; stabilized zirconia; an ion exchanger; and the like. The ion exchanger is not particularly limited as long as the ion exchanger is a substance that causes an ion exchange phenomenon, and examples of the ion exchanger include a zeolite (the zeolite can contain therein cations such as Na ions, K ions, or H ions), an ion-exchange resin acid, and the like. Among these ion-conductive ceramics, the ion-conductive ceramic is preferably a β"alumina, a β-alumina, or a zeolite, and more preferably a β"alumina or a β-alumina. Such an ion-conductive ceramic tends to have a high stability against water.

Each of the β"-alumina and the β-alumina includes a layered structure composed of an ion-conducting layer and a spinel block, and the metal ions are conducted inside the ion-conducting layer. The β"-alumina and the β-alumina have different crystal structures. Out of these, the β"-alumina has a higher sodium ion content in the crystal structure thereof and has a higher ionic conductivity. The β"-alumina and the β-alumina are preferably a Na-β"-alumina and a Na-β-alumina which conduct sodium ions, respectively. The chemical compositions of the Na-β"-alumina and the Na-β-alumina are typically $Na_2O \cdot xAl_2O_3$ (x=5 to 7) and $Na_2O \cdot xAl_2O_3$ (x=9 to 11), respectively.

In the internal solid layer 104, the substance that conducts the metal ions such as the ion-conductive ceramic may be contained in any shape but is preferably contained as particles. The shape of each particle is not particularly limited and may be, for example, a scale shape, a columnar shape, a spherical shape, an ellipsoidal shape, or the like.

The above ion-conductive ceramics and shapes thereof may be used singly, or two or more of them may be used in combination.

If the substance that conducts the metal ions such as the ion-conductive ceramic is contained in the form of particulates in the internal solid layer 104, the average particle diameter of the particles is preferably adjusted according to the average particle diameter of the compound that reversibly undergoes the oxidation-reduction reaction such as the insertion material.

If descriptions are given by taking the ion-conductive ceramic and the insertion material as examples, the average particle diameter of the ion-conductive ceramic is preferably smaller than the average particle diameter of the insertion material. Specifically, the ratio of the average particle diameter of the ion-conductive ceramic to the average particle diameter of the insertion material (=the average particle diameter of the ion-conductive ceramic/the average particle diameter of the insertion material) is, for example, 0.001 to 0.7, preferably 0.005 to 0.6, and more preferably 0.01 to 0.3. The above ratio may be not higher than 0.1 or not higher than 0.05 within the above range. If the average particle diameter of the ion-conductive ceramic is smaller than the average particle diameter of the insertion material, and the ratio between both average particle diameters is within the above range, the oxidation-reduction reaction in the insertion material tends to occur more stably, and thus the reference electrode 100 tends to have a more stable electrode potential.

The above average particle diameter may be specifically 0.02 to 7 μm, 0.05 to 5 μm, 0.1 to 3 μm, or 0.15 to 1 μm. The above average particle diameter may be not larger than 0.5 μm within the above range. The above average particle diameter only has to be measured by a laser diffraction/scattering type device for measuring a distribution of particle diameters.

Regarding the substance that conducts the metal ions such as the ion-conductive ceramic, the substance content is, for example, 15 to 70 parts by mass, preferably 20 to 65 parts by mass, and more preferably 25 to 60 parts by mass with respect to the total mass (100 parts by mass) of the internal solid layer 104.

In the internal solid layer 104, the mass ratio (insertion material:ion-conductive ceramic) of the insertion material (the compound that reversibly undergoes an oxidation-reduction reaction) to the ion-conductive ceramic (the substance that conducts ions related to the oxidation-reduction reaction) is, for example, 5:1 to 1:5, preferably 2:1 to 1:2, more preferably 1.5:1.0 to 1.0:1.5, further preferably 1.2:1.0 to 1.0:1.2, and even further preferably 1.1:1.0 to 1.0:1.1. If the above mass ratio is within the above range, the oxidation-reduction reaction in the insertion material tends to occur more stably, and thus the reference electrode 100 tends to have a more stable electrode potential.

The internal solid layer 104 preferably further contains an electrically-conductive agent. The electrically-conductive agent is not particularly limited as long as the electrically-conductive agent has electrical conductivity. For example, it is possible to use: carbon materials such as carbon black, acetylene black, KETJENBLACK, carbon nanotube, graphene, carbon powder, fluorocarbon, and graphite powder; electrically-conductive fibers such as metal fiber; metal powders such as aluminum powder; electrically-conductive whiskers of zinc oxide, potassium titanate, and the like; electrically-conductive metal oxides such as titanium oxide; organic electrically-conductive materials such as phenylene derivatives and graphene derivatives; and the like. Among these electrically-conductive agents, a carbon material is preferably used.

The above electrically-conductive agents and shapes thereof may be used singly, or two or more of them may be used in combination.

The electrically-conductive agent content is, for example, 0.1 to 20 parts by mass, preferably 1 to 15 parts by mass, and more preferably 2 to 10 parts by mass with respect to the total mass (100 parts by mass) of the internal solid layer 104.

In the internal solid layer 104, the mass ratio (insertion material:electrically-conductive agent) of the insertion material (the compound that reversibly undergoes an oxidation-reduction reaction) to the electrically-conductive agent is, for example, 20:1 to 1:1, preferably 15:1 to 3:1, and more preferably 10:1 to 6:1.

The internal solid layer 104 preferably further contains a binding agent (binder) in order to more firmly bind together the above components. Consequently, the reference electrode 100 tends to have a more stable electrode potential.

The binding agent is not particularly limited as long as the binding agent can bind together the components contained in the internal solid layer 104. Examples of the binding agent include: polymers such as polyvinylidene fluoride, polyvinylpyrrolidone, polytetrafluoroethylene, polyethylene, polypropylene, aramid resins, polyamides, polyimides, polyamide-imides, polyacrylonitrile, polyacrylic acid, polymethyl acrylate, polyethyl acrylate, polyhexyl acrylate, polymethacrylic acid, polymethyl methacrylate, polyethyl methacrylate, polyhexyl methacrylate, acrylic emulsions, polyvinyl acetate, polyvinylpyrrolidone, polyether, polyether sulfone, hexafluoropolypropylene, styrene-butadiene rubbers, and carboxymethyl cellulose; analogues obtained by introducing modification groups to these polymers; and copolymers each made from a plurality of the above polymers. Among these binding agents, (a) polyvinylidene fluoride, a (b) mixture containing styrene-butadiene latex and carboxymethyl cellulose, a (c) mixture containing a polyamide, a polyimide, and a carbodiimide, (d) polytetrafluoroethylene, or an (e) acrylic emulsion is preferably used, and polyvinylidene fluoride is more preferably used.

The above binding agents may be used singly, or two or more of them may be used in combination.

The binding agent content is, for example, 0.1 to 20 parts by mass, preferably 1 to 15 parts by mass, and more preferably 2 to 10 parts by mass with respect to the total mass (100 parts by mass) of the internal solid layer 104.

In the internal solid layer 104, the mass ratio (insertion material:binding agent) of the insertion material (the compound that reversibly undergoes an oxidation-reduction reaction) to the binding agent is, for example, 20:1 to 1:1, preferably 15:1 to 3:1, and more preferably 10:1 to 6:1.

The internal solid layer 104 may contain a component other than the above components. Examples of the other component include $MnCO_3$, $Na_2CO_3$, $Al_2O_3$, and the like.

In the internal solid layer, the total of the insertion material (the compound that reversibly undergoes an oxidation-reduction reaction) content, the ion-conductive ceramic (the substance that conducts ions related to the oxidation-reduction reaction) content, the electrically-conductive agent content, and the binding agent content is, for example, 70 to 100 parts by mass, preferably 80 to 100 parts by mass, more preferably 90 to 100 parts by mass, further preferably 95 to 100 parts by mass, and even more preferably 99 to 100 parts by mass with respect to the total mass (100 parts by mass) of the internal solid layer 104.

In FIG. 1, the internal solid layer 104 is illustrated as a single layer. However, the internal solid layer 104 may have a single layer structure composed of a single composition or may have a multi-layer structure including two or more layers that have compositions different from one another.

The average thickness of the internal solid layer 104 is, for example, 1 to 200 μm, preferably 1 to 100 μm, more preferably 1 to 50 μm, and further preferably 1 to 20 μm. If the internal solid layer 104 has an average thickness that is within the above range, a reference electrode that has a stable electrode potential tends to be capable of being manufactured with favorable manufacturing efficiency, manufacturing cost, and the like.

(Ionic-Liquid-Containing Membrane)

The ionic-liquid-containing membrane 106 is disposed on the internal solid layer 104. In the reference electrode 100, the ionic-liquid-containing membrane 106 coats an upper surface and a side surface of the internal solid layer 104 and is configured to prevent the internal solid layer 104 from coming into direct contact with a specimen solution at the time of use of the reference electrode 100.

The ionic-liquid-containing membrane 106 is a member in the form of a membrane containing an ionic liquid and is in a gel form or a semi-solid form. The ionic-liquid-containing membrane 106 contains an ionic liquid. The ionic liquid refers to a salt in a dissolved state (liquid state) at normal temperature and is composed of cations and anions. The ionic-liquid-containing membrane 106 is in contact with the hydrophilic membrane 108, and thus the ionic liquid contained in the ionic-liquid-containing membrane 106 is distributed to each of the hydrophilic membrane 108 and the ionic-liquid-containing membrane 106 according to the solubility of the ionic liquid in water. The ionic liquid has low solubility in water, and thus, at the interface between the hydrophilic membrane 108 and the ionic-liquid-containing membrane 106, the concentration of the ionic liquid is promptly fixed so that equilibrium is attained. Therefore, the liquid junction potential difference can be made smaller than in the conventional reference electrode.

The ionic liquid is not particularly limited as long as the ionic liquid is a salt in a liquid state at normal temperature. From the viewpoint of reducing the proportion of the ionic liquid that is distributed to the hydrophilic membrane 108, the ionic liquid is preferably a hydrophobic ionic liquid.

Examples of the cations in the ionic liquid include imidazolium cations, pyridinium cations, piperidinium cations, pyrrolidinium cations, quaternary ammonium cations, phosphonium cations, and arsonium cations. Among these cations, imidazolium cations and phosphonium cations are preferable.

Examples of the anions in the ionic liquid include $[R^1SO_2NSO_2R^2]^-$ ($R^1$ and $R^2$ each independently represent a perfluoro alkyl group having 1 to 5 carbon atoms), borate ions containing fluorine and tetravalent boron, bis(2-ethylhexyl)sulfosuccinate, $AlCl_4^-$, $Al_3Cl_7^-$, $NO_3^-$, $BF_4^-$, $PF_6^-$, $CH_3COO^-$, $CF_3COO^-$, $CF_3SO_3^-$, $(CF_3SO_2)_2N^-$, $(CF_3SO_2)_3C^-$, $AsF_6^-$, $SbF_6^-$, $F(HF)n^-$, $CF_3CF_2CF_2SO_3^-$, $(CF_3CF_2SO_2)_2N^-$, $CF_3CF_2CF_2COO^-$, and the like. Among these anions, $[R^1SO_2NSO_2R^2]^-$ ($R^1$ and $R^2$ each independently represent a perfluoro alkyl group having 1 to 5 carbon atoms) is preferable.

The ionic liquid is, for example, a liquid containing at least one type of cation among the above cations and at least one type of anion among the above anions. The above ionic liquids may be used singly, or two or more of them may be used in combination.

The ionic-liquid-containing membrane 106 is preferably a gel membrane containing the ionic liquid. In this aspect, the ionic liquid is retained by a macromolecule crosslinked in a net pattern so that a membrane in a gel form is formed.

The macromolecule capable of being contained in the ionic-liquid-containing membrane 106 is not particularly limited, and examples of the macromolecule include vinylidene fluoride-hexafluoropropylene copolymer, polymethyl methacrylate, polyethyl methacrylate, polyacrylonitrile, polybutyl acrylate, polyvinylpyridine, organic oligomeric electrolytes (e.g., one in which the main-chain cation moiety thereof has a PICPM structure), polyvinyl chloride, other synthetic rubbers, and the like. The macromolecule may be crosslinked with a crosslinking agent and may be crosslinked with, for example, a crosslinking agent having a plurality of fluoroalkylated sulfonylamide groups.

The above macromolecules and crosslinking agents may be used singly, or two or more of them may be used in combination.

The ionic-liquid-containing membrane 106 may further contain a plasticizer. If a plasticizer is contained, the flexibility of the ionic-liquid-containing membrane 106 tends to be further improved, and, for example, mechanical properties such as the breaking strength thereof tend to be improved. The plasticizer is not particularly limited, and examples thereof include TEHP (tris(2-ethylhexyl)phosphate), NPOE (2-nitrophenyl octyl ether), DOP (dioctyl phthalate), DOS (dioctyl sebacate), DBE (dibasic acid ester), BA (butyl acrylate), and the like. These plasticizers may be used singly, or two or more of them may be used in combination.

Regarding the components in the ionic-liquid-containing membrane 106, for example, the ionic liquid content is 1 to 15 parts by mass, the macromolecule content is 15 to 45 parts by mass, and the plasticizer content is 50 to 80 parts by mass with respect to 100 parts by mass of the ionic-liquid-containing membrane. The ionic liquid content is preferably 1 to 10 parts by mass and more preferably 1 to 6 parts by mass with respect to 100 parts by mass of the ionic-liquid-containing membrane. If the ionic liquid content is within the above range, flow-out of the ionic liquid tends to be suppressed.

The ionic-liquid-containing membrane 106 may have a single layer structure composed of a single composition or may have a multi-layer structure including two or more layers that have compositions different from one another.

The average thickness of the ionic-liquid-containing membrane 106 is, for example, 1 to 200 μm and preferably 1 to 50 μm.

(Hydrophilic Membrane)

The hydrophilic membrane 108 is disposed on the ionic-liquid-containing membrane 106. In the reference electrode 100, the hydrophilic membrane 108 coats an upper surface and a side surface of the ionic-liquid-containing membrane 106.

The hydrophilic membrane 108 is a hydrophilic member in the form of a membrane, and thus a specimen solution can infiltrate the inside of the membrane. In addition, as described above, the ionic liquid is distributed thereto from the ionic-liquid-containing membrane 106, and equilibrium is promptly attained. Consequently, a stable potential is obtained. Since the reference electrode 100 has the hydrophilic membrane 108, the ionic-liquid-containing membrane 106 becomes less likely to come into contact with a biological specimen. This enables reduction in influence that various components in the biological specimen inflict on the surface state of the ionic-liquid-containing membrane 106. Consequently, a reference electrode that has a stable electrode potential even at the time of measurement of a biological specimen can be provided.

The present inventors have noticed the following phenomenon. That is, as described in EXAMPLES explained later, in a case where an electrode having no hydrophilic membrane and having an ionic-liquid-containing membrane exposed is immersed in a biological specimen, and the electrode potential of the electrode is measured, the electrode potential is shifted to the positive side as compared to a case where the electrode is immersed in a specimen solution (e.g., buffer solution) that is not a biological specimen. Further, the present inventors have found that one of the causes of this phenomenon is influence of albumin contained in the biological specimen. Moreover, the present inventors have found that the influence of the albumin is reduced if a hydrophilic membrane is disposed on the ionic-liquid-containing membrane. Therefore, in particular, since the reference electrode 100 has the hydrophilic membrane 108, the reference electrode 100 can be set to have a stable electrode potential regardless of presence/absence of albumin or the concentration thereof.

The hydrophilic membrane 108 is not particularly limited as long as the hydrophilic membrane has hydrophilicity. That is, the hydrophilic membrane 108 may be in any form as long as the hydrophilic membrane does not repel but can be infiltrated with a specimen solution. The hydrophilic membrane 108 preferably contains a hydrophilic macromolecule.

In one aspect of the present embodiment, the hydrophilic macromolecule may contain at least one type selected from the group consisting of a polysaccharide and a crosslinked product thereof.

Examples of the polysaccharide include pullulan, cellulose, guar gum, xanthan gum, tamarind seed gum, carrageenan, agar, pectin, gum arabic, soybean polysaccharides, acarbose, amylopectin, inulin, chitin, chitosan, beta-glucan, glycogen, α-cyclodextrin, β-cyclodextrin, γ-cyclodextrin, stachyose, dextran, dextrin, maltotriose, mannan, melezitose, raffinose, and levan. Among these polysaccharides, pullulan, cellulose, pectin, acarbose, amylopectin, inulin, chitin, chitosan, beta-glucan, glycogen, α-cyclodextrin, β-cyclodextrin, γ-cyclodextrin, stachyose, dextran, dextrin, maltotriose, mannan, melezitose, raffinose, levan, and derivatives of these polysaccharides are preferable, and cellulose, pullulan, and derivatives of these polysaccharides are more preferable.

Examples of the crosslinked product of the polysaccharide include crosslinked products each obtained by crosslinking any of the above polysaccharides by means of an appropriate crosslinking agent or by means of application of radioactive rays or an electron beam. Examples of the derivatives of the above polysaccharides include derivatives each obtained by substituting a hydroxy group of a sugar chain of any of the polysaccharides with a substituent in order to improve the water-solubility of the polysaccharide.

With cellulose being taken as an example of the polysaccharide, the derivative of the polysaccharide is exemplified below. Examples of the cellulose derivative include hypromellose (hydroxypropyl methylcellulose (HPMC)), hypromellose phthalate (HPMCP), hypromellose acetate succinate (HPMCAS), hydroxypropyl cellulose (HPC), cellulose acetate phthalate (cellacefate), carboxy methyl ethyl cellulose (CMEC), ethyl cellulose, METOLOSE (registered trademark), and the like. METOLOSE is a derivative obtained by substituting some of hydrogen atoms of hydroxy groups of a cellulose with a methyl group ($-CH_3$), a hydroxypropyl group ($-CH_2CH(OH)CH_3$), and/or a hydroxyethyl group ($-CH_2CH_2OH$), thereby having improved water-solubility.

Therefore, examples of the derivative of the polysaccharide include hydroxypropyl methyl derivatives, phthalic acid ester derivatives, acetic acid ester derivatives, succinic acid ester derivatives, hydroxypropyl derivatives, acetic acid/phthalic acid derivatives, carboxy methyl ethyl derivatives, ethyl derivatives, and the like.

In one aspect of the present embodiment, the hydrophilic macromolecule may contain at least one type selected from the group consisting of: polyvinyl alcohol, polyethylene oxide, polyvinylpyrrolidone, sodium polyacrylate, polymethyl methacrylate, and aminoalkyl methacrylate copolymer; polymers each containing a monomer unit derived from acrylamide, 2-methacryloyloxyethyl phosphorylcholine, or myristyl alcohol; derivatives of these; and crosslinked products of these.

The derivatives of polyvinyl alcohol, polyethylene oxide, polyvinylpyrrolidone, sodium polyacrylate, polymethyl methacrylate, and aminoalkyl methacrylate copolymer, and the derivatives of the polymers each containing a monomer unit derived from acrylamide, 2-methacryloyloxyethyl phosphorylcholine, or myristyl alcohol, are not particularly limited as long as the hydrophilicities of these derivatives are not impaired. For example, a derivative obtained by further introducing a hydrophilic group may be used. Such a hydrophilic group is not particularly limited, and examples thereof include a hydroxy group. Examples of these include crosslinked products each obtained by crosslinking any of the above hydrophilic macromolecules by means of an appropriate crosslinking agent or by means of application of radioactive rays or an electron beam.

Alternatively, the hydrophilic macromolecule may be: a (meth)acrylic-based polymer containing a monomer unit derived from a (meth)acrylate or a (meth)acrylamide; or an amine-based polymer containing a monomer unit derived from allylamine, ethylene imine, or oxazoline. The hydrophilic macromolecule may be: one obtained by providing a hydrophilic coating on a surface of a hydrophobic macromolecule; or one obtained by introducing a hydrophilic functional group to a hydrophobic macromolecule. Examples of such a hydrophobic macromolecule include polystyrene, polyether sulfone, and the like. Examples of the hydrophilic coating include cellulose coatings, polyvinylpyrrolidone coatings, and the like.

The crosslinking agent used for crosslinking the above hydrophilic macromolecule is as follows. Examples of the crosslinking agent in a case where the hydrophilic macromolecule contains polyvinyl alcohol include oxalic acid, boric acid, adipic acid chloride, glyoxal, thioglycolic acid, polymethacrylic acid, polyacrylic acid, glutaraldehyde, hexamethylenetetramine, dimethyl sulfoxide (DMSO), maleic acid, citric acid, and formaldehyde. Examples of the crosslinking agent in a case where the hydrophilic macromolecule contains a polysaccharide (particularly, carboxymethyl cellulose) include calcium chloride, ethylene glycol diglycidyl ether (EGDE), and dicarboxylic acid halides. Examples of the crosslinking agent in a case where the hydrophilic macromolecule contains sodium polyacrylate include metal ions (of calcium chloride, aluminum hydroxide, and the like) having a valence of not smaller than 2. Examples of the crosslinking agent in a case where the hydrophilic macromolecule contains polymethyl methacrylate include ethyleneglycol dimethacrylate. In addition, a crosslinked polyacrylamide can be obtained by copolymerizing acrylamide with a crosslinking agent such as N,N'-methylene bisacrylamide.

If the above hydrophilic macromolecule is contained, the electrode potential of the reference electrode 100 at the time of measurement of a biological specimen tends to be capable of being further stabilized. The above hydrophilic macromolecules may be used singly, or two or more of them may be used in combination.

It is also preferable that the hydrophilic membrane 108 contains a water-soluble hydrophilic macromolecule among the above hydrophilic macromolecules. In this aspect, the hydrophilic membrane 108 gradually dissolves during measurement of a biological specimen, and thus a situation in which the surface of the hydrophilic membrane 108 is not contaminated with a component of the biological specimen tends to be capable of being constantly realized. Therefore, the reference electrode according to this aspect tends to have a further stable electrode potential even at the time of measurement of a biological specimen.

The hydrophilic membrane 108 may contain another component in addition to the hydrophilic macromolecule. Such a component is not particularly limited, and examples thereof include monosaccharides, disaccharides, and other additives. If the hydrophilic membrane 108 contains these components, the degree of hydrophilicity and the water-solubility of the hydrophilic membrane 108 tend to be capable of being controlled.

Examples of the monosaccharides include allose, arabinose, altrose, idose, erythritol, erythrulose, erythrose, galactose, galactosamine, xylitol, xylulose, xylose, glyceraldehyde, glucuronic acid, glucose, glycolaldehyde, gulose, colitose, dihydroxyacetone, sedoheptulose, sorbose, tagatose, talose, 2-deoxy-D-ribose, fuculose, fucose, psicose, fructose, mannose, rhamnose, lyxose, ribulose, and ribose.

Examples of the disaccharides include sucrose, cellobiose, turanose, trehalose, maltitol, maltose, melibiose, lactulose, lactobionic acid, and lactose. Among them, trehalose is preferably used.

Examples of the other additives include alcohols such as glycerol and derivatives thereof.

The hydrophilic membrane 108 may have a single layer structure composed of a single composition, may have a multi-layer structure including two or more layers that have compositions different from one another, or may have a laminated structure in which two or more layers having different compositions are repeatedly or randomly stacked.

The average thickness of the hydrophilic membrane 108 is, for example, not smaller than 1 µm and not larger than 1000 µm, preferably not smaller than 5 µm and not larger than 800 µm, more preferably not smaller than 6 µm and not larger than 400 µm, and further preferably not smaller than 8 µm and not larger than 100 µm. If the average thickness of the hydrophilic membrane 108 is not smaller than 1 µm, influence that various components in a biological specimen inflict on the surface state of the ionic-liquid-containing membrane 106 tends to be capable of being further reduced. Meanwhile, if the average thickness of the hydrophilic membrane 108 is not larger than 1000 µm, a potential difference generated owing to the hydrophilic membrane tends to be capable of being made smaller.

(Shape)

The shape of the reference electrode 100 is not particularly limited and can be, for example, any shape such as a columnar shape, an elliptical columnar shape, or a prismatic shape. Each of the constituents of the reference electrode 100 can be changed as appropriate according to the shape of the reference electrode 100.

(Use)

The reference electrode 100 is used as a reference electrode. Specifically, in a sensor or an electrochemical cell, the reference electrode 100 is used while being electrically connected to a working electrode, and the electrode potential of the working electrode relative to the electrode potential of the reference electrode 100 is ascertained.

The reference electrode 100 is preferably used as a disposable. For such use, the hydrophilic membrane 108 preferably contains at least one type of water-soluble macromolecule that can be selected from the group consisting of the polysaccharides and the derivatives thereof. The reference electrode 100 is preferably a calibration-free reference electrode.

(Manufacturing Method)

The reference electrode 100 may be manufactured by, for example, forming the internal solid layer 104 on the internal electrode 102 and further sequentially forming the ionic-liquid-containing membrane 106 and the hydrophilic membrane 108 thereon. Alternatively, the reference electrode 100 may be manufactured by sequentially forming the ionic-liquid-containing membrane 106 and the hydrophilic membrane 108 on the internal solid layer 104 and lastly joining the internal electrode 102 to one end of the internal solid layer 104. Alternatively, the reference electrode 100 may be manufactured by forming the ionic-liquid-containing membrane 106 on the internal solid layer 104 and then pressure-bonding, on the ionic-liquid-containing membrane 106, the hydrophilic membrane 108 having been separately produced.

The method for forming the internal solid layer is not particularly limited. The internal solid layer can be formed by, for example: mixing the above components and, as necessary, an appropriate solvent such as 1-methyl-2-pyrrolidone to obtain a composition; forming a film of the composition onto an insulator (or the internal electrode formed on the insulator); and drying the film. Examples of the method for forming a film of a mixture of the components include electrostatic application, application using a dispenser, screen printing, sputtering, vapor deposition, hot-pressing, and the like, and electrostatic application is preferable.

The method for forming the ionic-liquid-containing membrane may be, for example, a method including: mixing the ionic liquid, the above components such as the macromolecule and the plasticizer, and, as necessary, an appropriate solvent such as tetrahydrofuran to obtain a composition; forming a film of the composition onto the internal solid layer; and drying the film.

The hydrophilic membrane may be manufactured by, for example: mixing the above hydrophilic macromolecule and a solvent such as water or an alcohol to obtain a composition; directly dropping, applying, or spraying the composition onto the ionic-liquid-containing membrane; and drying the composition. Alternatively, after the hydrophilic membrane is produced by forming a film of the composition onto an appropriate substrate and drying the film, the obtained hydrophilic membrane may be pressure-bonded onto the ionic-liquid-containing membrane of the reference electrode.

In the case of crosslinking the hydrophilic macromolecule, after a film of the hydrophilic membrane is formed, radioactive rays or an electron beam may be applied to the film. Alternatively, a crosslinking agent may be further added to the composition containing the above hydrophilic macromolecule.

Examples of the method for producing a hydrophilic membrane having a multi-layer structure include a method including repeating a process of: mixing a hydrophilic macromolecule and a solvent to obtain a composition; dropping, applying, or spraying the composition; and drying the composition. Here, in the case of forming a first layer containing a hydrophilic macromolecule onto the ionic-liquid-containing membrane and then forming a second layer containing another hydrophilic macromolecule onto the first layer, a solvent to be used for forming the first layer and a solvent to be used for forming the second layer are preferably different from each other. Through such a method, when, for forming the second layer, the composition containing the corresponding hydrophilic macromolecule and the corresponding solvent is dropped on the first layer, the hydrophilic macromolecule in the first layer is inhibited from being dissolved again, and thus a multi-layer structure having the layers containing the respective hydrophilic macromolecules can be suitably obtained.

More specifically, for example, a first layer containing a hydrophilic macromolecule may be formed on the ionic-liquid-containing membrane by using water as a solvent, and then a second layer containing a hydrophilic macromolecule different from the hydrophilic macromolecule contained in the first layer may be formed by using an alcohol as a solvent. In this method, an alcohol may be used as the solvent for forming the first layer, and water may be used as the solvent for forming the second layer. Alternatively, a hydrophilic membrane having a laminated structure may be produced by repeatedly forming layers containing different hydrophilic macromolecules by alternately using water and an alcohol as solvents.

(Modifications)

Figure 2A:
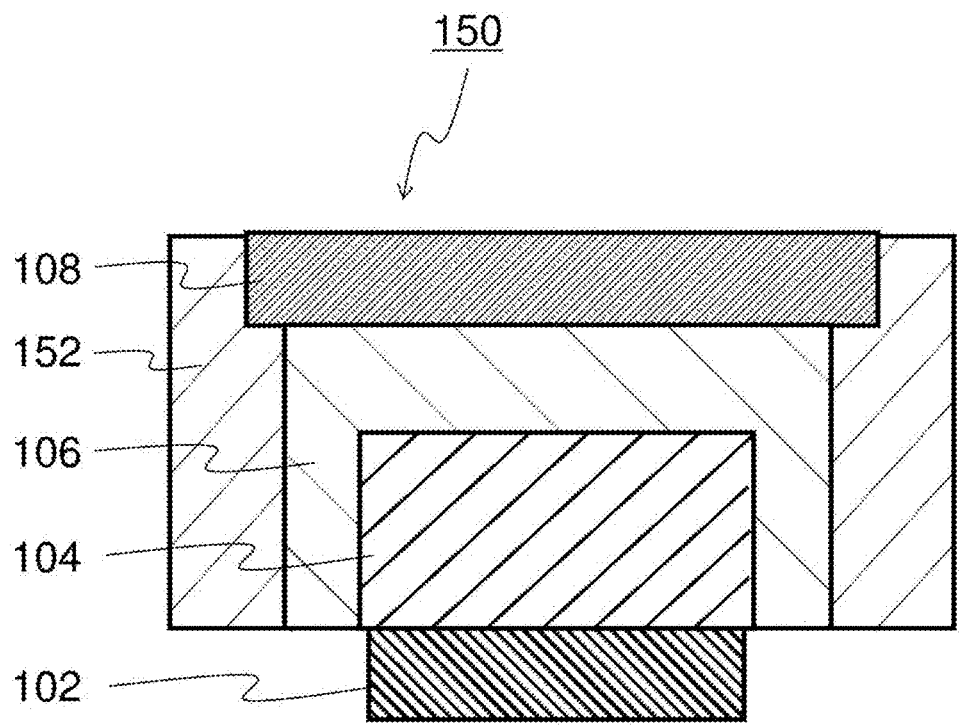
FIGS. 2A and 2B are each a schematic cross-sectional view of a modification of the reference electrode according to the embodiment of the present invention.
Figure 2B:
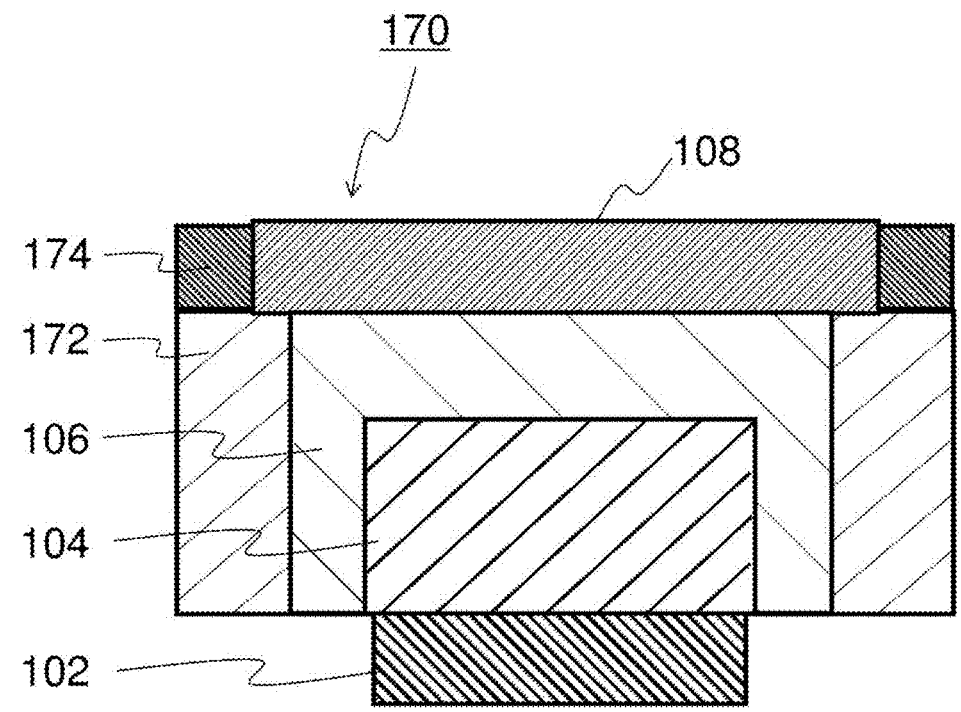

The above reference electrode 100 can be variously changed as long as the internal solid layer, the ionic-liquid-containing membrane, and the hydrophilic membrane are included. FIGS. 2A and 2B each show a modification of the reference electrode 100.

FIG. 2A is a schematic cross-sectional view of a reference electrode 150. The reference electrode 150 is different from the reference electrode 100 in that the hydrophilic membrane 108 coats only the upper surface portion of the ionic-liquid-containing membrane 106 and does not coat the side surface portion of the ionic-liquid-containing membrane 106. In the reference electrode 150, the side surface of the ionic-liquid-containing membrane 106 is coated with a coating member 152.

The coating member 152 is, for example, a member having insulating properties. The member is not infiltrated with the ionic liquid in the ionic-liquid-containing membrane 106 and does not react with the ionic liquid. The coating member 152 may serve to fix the ionic-liquid-containing membrane 106 and the hydrophilic membrane 108.

The coating member 152 is not particularly limited, and examples thereof include a sealing material ordinarily used for manufacturing an electrode, a tape such as an insulating tape, and the like.

FIG. 2B is a schematic cross-sectional view of a reference electrode 170. The reference electrode 170 is different from the reference electrode 150 in that the coating member can be separated into: a first coating member 172 coating the side surface portion of the ionic-liquid-containing membrane 106; and a second coating member 174 coating the side surface portion of the hydrophilic membrane 108. The coating members 172 and 174 may be members that are made from the same material as that of the coating member 152.

In the reference electrode 170, since the coating member is configured to be capable of being separated as described above, it is possible to replace only the hydrophilic membrane 108 and the coating member 174. Therefore, this aspect makes it possible to replace only the hydrophilic membrane portion each time of measurement. Consequently, it is possible to repeatedly use, for measurement, the constituents other than the hydrophilic membrane portion while avoiding contamination of the specimen.

Second Embodiment: Internal-Solution-Type Reference Electrode

Figure 3:
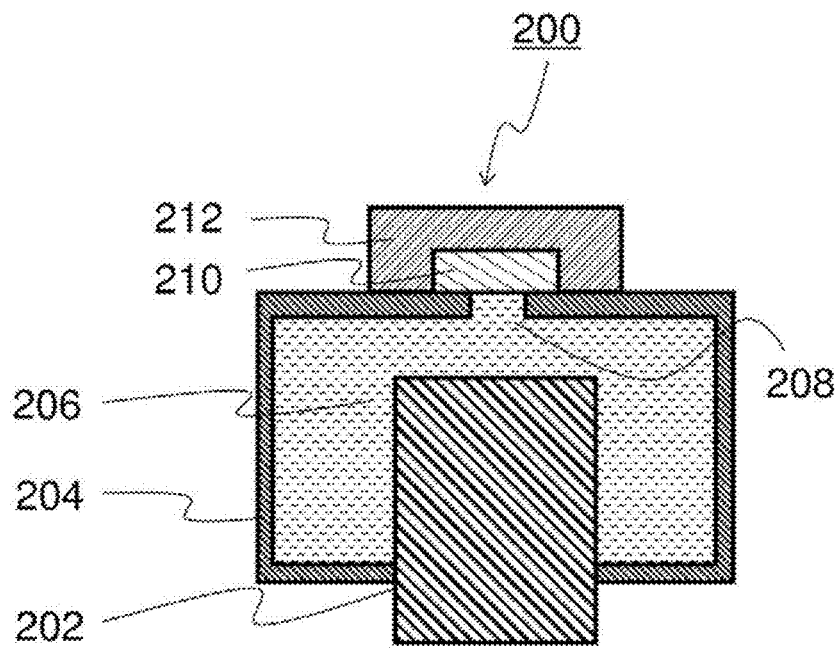
FIG. 3 is a schematic cross-sectional view of a reference electrode according to another embodiment of the present invention.

FIG. 3 is a schematic cross-sectional view of a reference electrode according to another embodiment of the present disclosure. As shown in FIG. 3, a reference electrode 200 according to the present embodiment includes: an internal electrode 202; an internal solution 206 in which the internal electrode is immersed; and an accommodating body 204 accommodating the internal electrode 202 and the internal solution 206. The accommodating body 204 has a liquid junction 208. An ionic-liquid-containing membrane 210 is provided to the liquid junction 208 such that the internal solution 206 and a specimen solution (not shown in FIG. 3) are isolated from each other. A hydrophilic membrane 212 is disposed on the specimen solution side and disposed on the ionic-liquid-containing membrane 210. The reference electrode 200 is an internal-solution-type reference electrode having therein an electrolytic solution.

Since the reference electrode 200 has the above configuration (in particular, since the reference electrode 200 includes the ionic-liquid-containing membrane 210 and the hydrophilic membrane 212), the reference electrode 200 has a stable electrode potential even at the time of measurement of a biological specimen. Hereinafter, each of the constituents will be described in detail, but the same descriptions as those regarding the reference electrode 100 will be omitted.

The electrode potential of the reference electrode 200 is defined by an oxidation-reduction reaction on the internal electrode 202. Ions or a compound in the internal solution 206 in addition to a compound on the internal electrode 202 may be involved in the oxidation-reduction reaction.

The reference electrode 200 may be, for example, a silver-silver chloride reference electrode, a mercury-mercury sulfate reference electrode, or a calomel electrode. The reference electrode 200 is preferably a silver-silver chloride electrode. Therefore, the internal electrode 202 is preferably a silver-silver chloride electrode. Although the internal electrode 202 is illustrated as a single member in FIG. 3, the internal electrode 202 may be an electrode in which a part of a lead electrode is coated with a compound such as silver-silver chloride. The lead electrode is an electrode that has electrical conductivity and that does not react with silver and chloride ions.

The internal solution 206 only has to be selected as appropriate according to the type of the internal electrode 202. For example, if the internal electrode 202 is a silver-silver chloride electrode, the internal solution 206 is a chloride-ion-containing aqueous solution such as a sodium chloride aqueous solution or a potassium chloride aqueous solution. The internal solution 206 is preferably a potassium chloride aqueous solution and more preferably a saturated potassium chloride aqueous solution.

The accommodating body 204 is not particularly limited as long as the accommodating body 204 can accommodate the internal electrode 202 and the internal solution 206. The accommodating body 204 may be, for example, a container made of glass or a molded product of a resin having chemical resistance, such as polytetrafluoroethylene.

The liquid junction 208 is a portion that is formed in the accommodating body 204 and that is for electrically connecting the internal solution 206 and a specimen solution to each other. The liquid junction 208 may be in any form as long as the liquid junction 208 exhibits such a function, and may be, for example, a portion implemented by a porous member made from glass, ceramic, or the like.

The ionic-liquid-containing membrane 210 is provided to the liquid junction 208 such that the internal solution and a specimen solution are isolated from each other. Since the ionic-liquid-containing membrane 210 is provided in this manner, the reference electrode 200 is configured such that, at the time of use thereof, the internal solution 206 does not come into direct contact with a specimen solution.

The ionic-liquid-containing membrane 210 may have the same configuration as that of the ionic-liquid-containing membrane 106 in the reference electrode 100. If the reference electrode 200 includes such an ionic-liquid-containing membrane, variation in the liquid junction potential difference between the inside of the reference electrode 200 (i.e., the internal solution 206) and a specimen solution is reduced. In addition, the component in the internal solution 206 is also inhibited from flowing into a specimen solution.

The ionic-liquid-containing membrane 210 may coat the accommodating body 204 from the outside thereof in order to isolate the internal solution and the specimen solution from each other, or may fill the porous portion of the liquid junction 208 in order to isolate the internal solution and a specimen solution from each other.

The hydrophilic membrane 212 is disposed on the specimen solution side and disposed on the ionic-liquid-containing membrane 210. In the reference electrode 200, the hydrophilic membrane 212 coats a portion, of the ionic-liquid-containing membrane 210, that is not in contact with the accommodating body 204. That is, the hydrophilic membrane 212 is disposed so as to coat the ionic-liquid-containing membrane 210. The hydrophilic membrane 212 may have the same configuration as that of the hydrophilic membrane 108 in the reference electrode 100. If the reference electrode 200 includes such a hydrophilic membrane, the ionic-liquid-containing membrane 210 becomes less likely to come into contact with a biological specimen. This enables reduction in influence that various components in the biological specimen inflict on the surface state of the ionic-liquid-containing membrane 210. Consequently, a reference electrode that has a stable electrode potential even at the time of measurement of a biological specimen can be provided.

The reference electrode 200 according to the present embodiment can be variously changed as long as the internal electrode, the accommodating body having the liquid junction, the internal solution, the ionic-liquid-containing membrane, and the hydrophilic membrane are included. The position, the number, and the form of the liquid junction are not limited to those shown in FIG. 3 and described above, and may be changed as appropriate.

The reference electrode 200 according to the present embodiment may be integrated with a working electrode such as a pH meter, to form a composite electrode.

The reference electrode 200 only has to be manufactured by, for example, forming the ionic-liquid-containing membrane on a liquid junction of a commercially available internal-solution-type reference electrode and further coating the ionic-liquid-containing membrane with the hydrophilic membrane. Methods for forming the ionic-liquid-containing membrane and the hydrophilic membrane are the same as those described in detail regarding the reference electrode 100.

Although the reference electrode according to the present disclosure has been described above by using the specific embodiments, the above embodiments are merely illustrative and can be changed as appropriate. The reference electrode according to the present disclosure is not particularly limited as long as the reference electrode includes the ionic-liquid-containing membrane and the hydrophilic membrane disposed on the ionic-liquid-containing membrane.

Third Embodiment: Albumin Measurement Electrode

Figure 4:
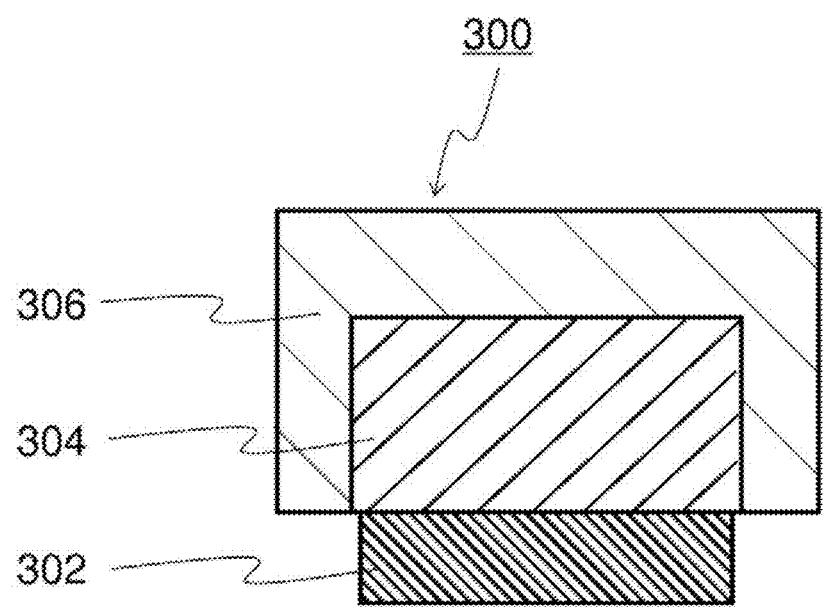
FIG. 4 is a schematic cross-sectional view of an albumin measurement electrode according to an embodiment of the present invention.

Another embodiment of the present disclosure relates to an electrode for detecting or measuring albumin inside a specimen solution. FIG. 4 is a schematic cross-sectional view of one aspect of the albumin measurement electrode according to the present embodiment. As shown in FIG. 4, an albumin measurement electrode 300 includes: an internal electrode 302; an internal solid layer 304 disposed on the internal electrode 302; and an ionic-liquid-containing membrane 306 disposed on the internal solid layer 304.

The albumin measurement electrode 300 is a working electrode for detecting or measuring albumin inside a specimen solution. The albumin measurement electrode 300 is used while being connected to the reference electrode, and the electrode potential of the albumin measurement electrode 300 relative to the electrode potential of the reference electrode is measured.

The present inventors have found that, as described above and as described in detail in EXAMPLES explained later, the electrode potential of an electrode including an ionic-liquid-containing membrane varies according to the concentration of albumin in a measurement specimen. Although the factor in the variation is not entirely clarified, the variation is considered to occur because, if albumin is present in a measurement specimen, a state in which cations and anions of an ionic liquid in the ionic-liquid-containing membrane are distributed to the measurement specimen is changed.

More specifically, it is inferred that a higher concentration of albumin that is present near the ionic-liquid-containing membrane makes it more likely for the anions to be distributed into the measurement specimen but makes it less likely for the cations to be distributed into the measurement specimen. It is noted that the operation principle of the albumin measurement electrode 300 is not limited to that described regarding the above factor.

Conventionally, an antibody-using electrode used as an albumin measurement electrode uses an antibody and thus tends to require high manufacturing cost. Meanwhile, the albumin measurement electrode 300 does not have to contain: such an antibody; an aptamer, a molecularly imprinted polymer, or an albumin-labeling dye that simulate the structure of the antibody; or the like. Thus, manufacturing cost for the albumin measurement electrode 300 can be made low. In addition, the albumin measurement electrode 300 does not respond to γ-globulin contained in the largest amount next to albumin in blood, and thus can specifically detect albumin in blood.

The internal electrode 302, the internal solid layer 304, and the ionic-liquid-containing membrane 306 have the same configurations, and also involve the same preferable aspects, as those of the internal electrode 102, the internal solid layer 104, and the ionic-liquid-containing membrane 106 in the reference electrode 100, respectively. For a manufacturing method for the albumin measurement electrode 300, refer to the manufacturing method for the reference electrode 100 as appropriate. Methods for forming the internal electrode 302, the internal solid layer 304, and the ionic-liquid-containing membrane 306 may be the same as the methods for forming the internal electrode 102, the internal solid layer 104, and the ionic-liquid-containing membrane 106, respectively.

The albumin measurement electrode 300 according to the present embodiment can be variously changed as long as the albumin measurement electrode 300 includes an ionic-liquid-containing membrane that is to be immersed in, or brought into contact with, a measurement specimen. For example, the albumin measurement electrode can be obtained by disposing the above ionic-liquid-containing membrane instead of a sensitive membrane of a commercially available ion-selective electrode.

The albumin measurement electrode 300 is used for, for example, detecting albumin inside a specimen solution or measuring the concentration of the albumin inside the specimen solution. The specimen solution is preferably a biological specimen and more preferably serum.

The present embodiment further provides a method for detecting albumin inside a specimen solution or measuring the concentration of the albumin by using the above albumin measurement electrode. This method includes the steps of: immersing the albumin measurement electrode according to the present embodiment and an appropriate reference electrode in a measurement specimen; and measuring the potential difference between both electrodes.

Fourth Embodiment: Sensor

Figure 5A:
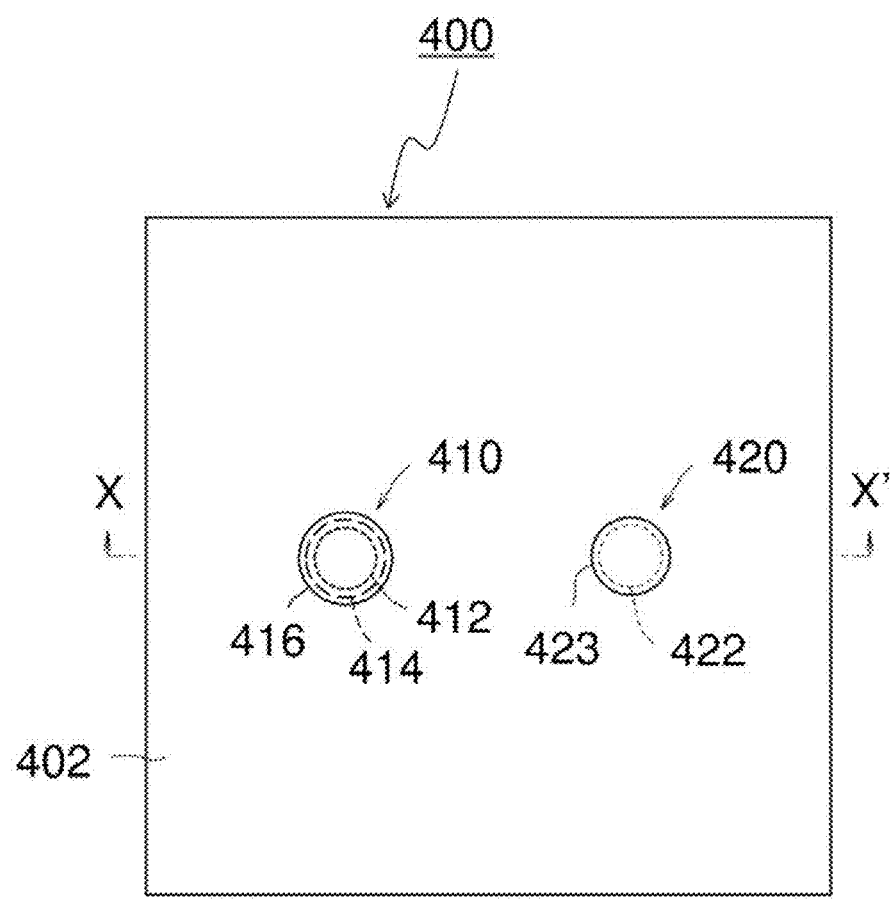
FIG. 5A is a schematic plan view of a sensor according to an embodiment of the present invention.
Figure 5B:
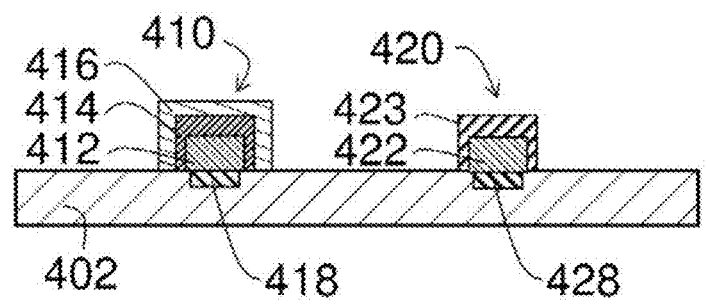
FIG. 5B is a schematic cross-sectional view of the sensor taken at a line X-X'.

Still another embodiment of the present disclosure relates to a sensor including two electrodes. FIG. 5A is a schematic plan view of one aspect of the sensor according to the present embodiment. FIG. 5B is a schematic cross-sectional view of the sensor taken at a line X-X'. As shown in FIGS. 5A and 5B, a sensor 400 includes: an insulation substrate 402; and a first electrode 410 and a second electrode 420 disposed on the insulation substrate 402.

The sensor 400 measures the electrode potential of the second electrode 420 relative to the electrode potential of the first electrode 410. That is, in the sensor 400, the first electrode 410 is a reference electrode, and the second electrode 420 is a working electrode.

The first electrode 410 includes: an internal electrode 418; an internal solid layer 412 disposed on the internal electrode 418; an ionic-liquid-containing membrane 414 disposed on the internal solid layer 412; and a hydrophilic membrane 416 disposed on the ionic-liquid-containing membrane 414. The first electrode 410 may be the above reference electrode 100, 150, or 170. That is, the internal electrode 418, the internal solid layer 412, the ionic-liquid-containing membrane 414, and the hydrophilic membrane 416 may have the same configurations, and also involve the same preferable aspects, as those of the internal electrode 102, the internal solid layer 104, the ionic-liquid-containing membrane 106, and the hydrophilic membrane 108 in the reference electrode 100, respectively. Therefore, the first electrode 410 is an electrode that has a stable electrode potential even at the time of measurement of a biological specimen.

The second electrode 420 includes: an internal electrode 428; an internal solid layer 422 disposed on the internal electrode 428; and an ion-selective membrane 423 disposed on the internal solid layer 422. The internal electrode 428 and the internal solid layer 422 may have the same configurations, and also involve the same preferable aspects, as those of the internal electrode 102 and the internal solid layer 104 in the reference electrode 100, respectively.

Each of the components contained in the internal solid layer 422 is preferably changed as appropriate according to measurement ions. For example, the internal solid layer 422 preferably contains: an insertion material for measurement ions; and a substance capable of conducting the measurement ions.

In the sensor 400, it is preferable that: the internal electrode 418 and the internal electrode 428 are substantially same as each other; and the internal solid layer 412 and the internal solid layer 422 are substantially same as each other. Such a sensor can be manufactured through a small number of steps, and thus manufacturing cost therefor is further reduced. In addition, if the internal electrode and the internal solid layer are substantially same between the first electrode and the second electrode, even when the interface potential between the internal solid layer and the internal electrode temporally changes at the time of measurement, changes of the interface potentials in the first electrode and the second electrode become approximately equal to each other. Consequently, in the case of measuring the electrode potential of the second electrode relative to the electrode potential of the first electrode, the changes of the interface potentials cancel each other out. Therefore, more temporally-stable measurement tends to be capable of being performed.

The phrase "two internal electrodes are substantially same" means that the two internal electrodes are made from materials that have substantially the same composition. The phrase "two internal solid layers are substantially same" means that the two internal solid layers have substantially the same composition.

(Ion-Selective Membrane)

The second electrode 420 includes the ion-selective membrane 423, and thus the electrode potential of the second electrode 420 changes according to the concentration of measurement ions in a specimen solution. The first electrode 410 has a fixed electrode potential regardless of the concentration of the measurement ions, and thus the concentration of the measurement ions can be quantitatively determined by measuring the electrode potential of the second electrode 420 relative to the electrode potential of the first electrode 410.

The second electrode 420 is configured such that, since the ion-selective membrane 423 coats an upper surface and a side surface of the internal solid layer 422, the internal solid layer 422 does not come into direct contact with a specimen solution.

The ion-selective membrane 423 contains an ion-selective substance. The ion-selective substance refers to a substance that enables only predetermined ions to be recognized and taken up into the ion-selective membrane. The ion-selective substance only has to be selected as appropriate according to use of the sensor 400.

Examples of the ion-selective substance include an ionophore and a synthetic substance that have been conventionally known, and an ionophore is preferably used. Examples of the ionophore include valinomycin, monensin, rhodopsin, nonactin, monactin, ionomycin, gramicidin A, nigericin, CCCP (carbonyl cyanide-m-chlorophenylhydrazone), FCCP (carbonyl cyanide-p-trifluoromethoxyphenylhydrazone), and the like. Examples of the synthetic substance include crown ethers, acyclic nonylphenoxypolyethanol, and the like. More specific examples of the synthetic substance include DD16C5, Bis-12Crown-4, 12-Crown-4, 15-Crown-5, 18-Crown-6, calixarene, and the like. The above ion-selective substances may be used singly, or two or more of them may be used in combination.

The ion-selective membrane 423 preferably contains a binder resin in addition to the ion-selective substance. The binder resin is not particularly limited, and examples thereof include polyvinyl chloride, polyvinylidene chloride, polyacrylonitrile, polyurethane, polyvinyl acetate, silicon elastomer, polyvinyl alcohol, cellulose ester, polycarbonate, vinyl chloride-vinyl acetate copolymer, vinyl chloride-vinyl acetate-vinyl alcohol copolymer, vinyl chloride-vinylidene chloride copolymer, and the like. The above binder resin components may be used singly, or two or more of them may be used in combination.

The ion-selective membrane 423 preferably further contains a plasticizer. If a plasticizer is contained, the flexibility of the ion-selective membrane 423 tends to be further improved, and, for example, mechanical properties such as the breaking strength thereof tend to be improved. As the plasticizer, a plasticizer capable of being contained in the ionic-liquid-containing membrane 106 may be used.

The ion-selective membrane 423 preferably further contains an anion scavenger. The anion scavenger can be selected as appropriate according to the measurement ions. Examples of the anion scavenger include tetraphenylborate salts such as sodium tetrakis(4-chlorophenyl)borate (Na-TCPB), potassium tetrakis(4-chlorophenyl)borate (K-TCPB), sodium tetrakis[3,5-bis(trifluoromethyl)phenyl]borate (Na-TFPB), potassium tetrakis[3,5-bis(trifluoromethyl)phenyl]borate (K-TFPB), potassium tetraphenylborate (K-TPB), sodium tetraphenylborate (Na-TPB), and sodium tetrakis[3,5-bis(1,1,1,3,3,3-hexafluoro-2-methoxy-2-propyl)phenyl]borate. The above anion scavengers may be used singly, or two or more of them may be used in combination.

Regarding the components in the ion-selective membrane 423, for example, the ion-selective substance content is 1 to 10 parts by mass, the binder resin content is 15 to 45 parts by mass, the plasticizer content is 50 to 80 parts by mass, and the anion scavenger content is 0.1 to 5 parts by mass with respect to the total mass (100 parts by mass) of the ion-selective membrane 423.

The ion-selective membrane 423 may have a single layer structure composed of a single composition or may have a multi-layer structure including two or more layers that have compositions different from one another.

The average thickness of the ion-selective membrane 423 is, for example, 30 to 300 µm.

(Insulation Substrate)

The insulation substrate 402 serves to hold the first electrode 410 and the second electrode 420. The insulation substrate 402 is not particularly limited as long as the insulation substrate 402 has insulating properties and does not electrically connect the first electrode 410 and the second electrode 420 to each other. The insulation substrate may be, for example, a substrate containing: polyvinyl alcohol; a polyester-based resin such as polyethylene terephthalate, polybutylene terephthalate, polyethylene naphthalate, or polybutylene naphthalate; a polyimide; an epoxy resin; glass; ceramic; a metal oxide; a fiber base material such as paper; or the like.

(Use)

The sensor 400 can be used as any type of ion sensor by changing the type of the ion-selective membrane 423 as appropriate. The sensor 400 may be, for example, a sodium sensor or a potassium sensor. In addition, the sensor 400 is suitably used as a biological specimen measurement sensor and is suitably used also as a disposable sensor. The sensor 400 is preferably a calibration-free sensor.

Figure 6:
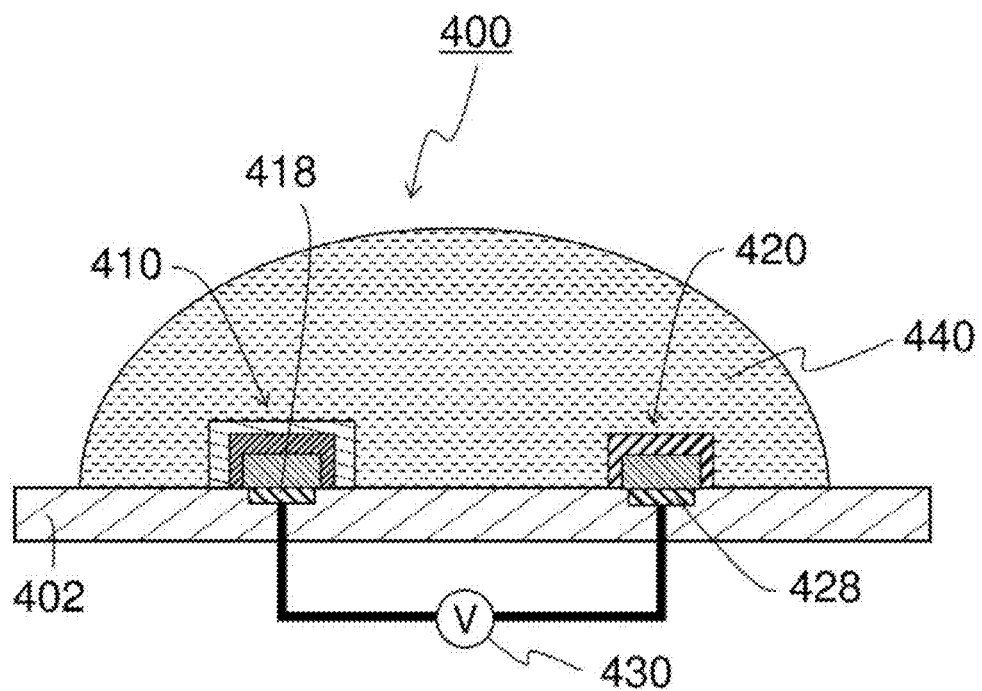
FIG. 6 is a schematic cross-sectional view regarding a manner of using the sensor according to the embodiment of the present invention.

FIG. 6 shows an example of the manner of using the sensor 400. As shown in FIG. 6, a measurement specimen 440 is dropped on the insulation substrate 402 such that the first electrode 410 and the second electrode 420 are immersed in the measurement specimen 440. The measurement specimen may be a biological specimen. In a state where the first electrode 410 and the second electrode 420 are in contact with the measurement specimen, a potentiometer 430 connected to the internal electrodes 418 and 428 detects the potential difference between both electrodes, and thus the concentration of measurement ions in the measurement specimen can be measured.

Alternatively, in another aspect, the sensor according to the present embodiment may be configured to measure current flowing between the first electrode and the second electrode, to be used.

Since the sensor 400 is used as described above, a gap (shortest distance) between the first electrode 410 and the second electrode 420 is, for example, preferably not smaller than 2 mm from the viewpoint of further stabilizing the potential in ion measurement. From the same viewpoint, the gap is more preferably not smaller than 3 mm, further preferably not smaller than 4 mm, and even more preferably not smaller than 5 mm. The upper limit of the gap is, for example, 20 mm, 15 mm, 10 mm, 8 mm, or 6 mm from the viewpoint of enabling a smaller amount of the same specimen to be simultaneously brought into contact with both the ion-selective electrode and the reference electrode.

(Manufacturing Method)

The sensor 400 only has to be manufactured by forming the first electrode 410 and the second electrode 420 on the insulation substrate 402. For a manufacturing method for the first electrode 410, refer to the manufacturing method for the reference electrode according to either of the above embodiments as appropriate. Specifically, the manufacturing method only has to include: forming the internal electrode 418 onto the insulation substrate 402; and sequentially forming the internal solid layer 412, the ionic-liquid-containing membrane 414, and the hydrophilic membrane 416 onto the internal electrode 418.

A manufacturing method for the second electrode 420 only has to include, for example: forming the internal electrode 428 onto the insulation substrate 402; and sequentially forming the internal solid layer 422 and the ion-selective membrane 423 onto the internal electrode 428. The internal electrode 428 and the internal solid layer 422 only have to be formed through the same method as the manufacturing method for the reference electrode according to either of the above embodiments. The ion-selective membrane 423 may be formed through, for example, a method including: mixing the ion-selective substance, the above components such as the binder resin, the plasticizer, and the anion scavenger, and, as necessary, an appropriate solvent such as aceton to obtain a composition; forming a film of the composition onto the internal solid layer; and drying the film.

(Modification)

The sensor 400 according to the present embodiment can be variously changed as long as the sensor 400 includes two electrodes, and, out of the electrodes, an electrode that is used as a reference electrode includes an ionic-liquid-containing membrane and a hydrophilic membrane disposed on the ionic-liquid-containing membrane.

For example, the first electrode 410 is not limited to the above solid-type reference electrode and may be an internal-solution-type reference electrode such as the above reference electrode 200. In addition, the first electrode 410 may be a reference electrode obtained by modifying the reference electrode 100, 150, 170, or 200 as appropriate.

The second electrode 420 does not have to include the ion-selective membrane and may include, instead of the ion-selective membrane, a member capable of changing the electrode potential of the second electrode according to the concentration of a compound or ions in a measurement specimen. For example, the second electrode in the sensor 400 may be an electrode in which the ionic-liquid-containing membrane 306 is disposed instead of the ion-selective membrane 423 of the above second electrode. In this aspect, the second electrode is the albumin measurement electrode 300.

In the aspect in which the second electrode is the albumin measurement electrode 300, the internal electrode, the internal solid layer, and the ionic-liquid-containing membrane are preferably substantially same between the first electrode and the second electrode. Such a sensor can be manufactured through a small number of steps, and thus manufacturing cost therefor is further reduced. In addition, if the internal electrode, the internal solid layer, and the ionic-liquid-containing membrane are substantially same between the first electrode and the second electrode, even when the interface potential between the internal solid layer and the internal electrode and/or the interface potential between the internal solid layer and the ionic-liquid-containing membrane temporally changes at the time of measurement, changes of the interface potentials in the first electrode and the second electrode become approximately equal to each other. Consequently, in the case of measuring the electrode potential of the second electrode relative to the electrode potential of the first electrode, the changes of the interface potentials cancel each other out. Therefore, more temporally-stable measurement tends to be capable of being performed.

Further, in the sensor 400, a plurality of the second electrodes may be disposed on the insulation substrate 402. The plurality of the second electrodes may be identical to one another. In this aspect, a plurality of measurements can be performed simultaneously, and thus a sensor having a higher accuracy can be obtained. Alternatively, the plurality of the second electrodes may be different from one another. In this aspect, a plurality of components can be measured simultaneously. For example, the sensor 400 may include: one first electrode as a reference electrode; and a plurality of second electrodes. Here, the plurality of second electrodes may include an ion-selective electrode and the above albumin measurement electrode 300 and may include, as the ion-selective electrode, at least one type among a sodium ion-selective electrode, a potassium ion-selective electrode, and a chloride ion-selective electrode.

Although the present disclosure has been described above by using the specific embodiments, the above embodiments are merely illustrative and can be changed as appropriate. For example, aspects presented as examples and aspects described as, for example, preferable, more preferable, further preferable, and even more preferable aspects in the above embodiments may be arbitrarily combined. For example, for the sensor according to the present embodiment, there is an aspect in which: the first electrode is the reference electrode according to the first or second embodiment; and the second electrode is the albumin measurement electrode according to the third embodiment. In this aspect, a preferable, more preferable, further preferable, or even more preferable aspect of the reference electrode, a preferable, more preferable, further preferable, or even more preferable aspect of the albumin measurement electrode, and the like may be arbitrarily combined. In addition, numerical value ranges described in the present specification may be regarded as numerical value ranges obtained by arbitrarily combining upper limit values and lower limit values. For example, a lower limit value or an upper limit value of a preferable range, and a lower limit value or an upper limit value of a more preferable range, may be arbitrarily combined to select a numerical value range.

EXAMPLES

Hereinafter, the present disclosure will be more specifically described by using Examples and Comparative Examples. The present disclosure is not limited by the following Examples in any way.

Example 1: Examination of Performance of Electrode Including Ionic-Liquid-Containing Membrane (Production of Electrode)

An electrode including an internal electrode, an internal solid layer disposed on the internal electrode, and an ionic-liquid-containing membrane disposed on the internal solid layer as shown in FIG. 4 was produced.

First, an insertion material ($Na_{0.33}MnO_2$ (with an orthorhombic-crystal-system crystal structure, an average particle diameter of 8.9 μm, and a scale shape)), an ion-conductive ceramic (β"-alumina: $Na_2Al_{10.6}O_{15.9}$, an average particle diameter of 0.26 μm), an electrically-conductive agent (acetylene black), and a binding agent (polyvinylidene fluoride) were added and mixed in a solvent (1-methyl-2-pyrrolidone), with the composition ratio of insertion material:ion-conductive ceramic:electrically-conductive agent:binding agent being 8:8:1:1. Consequently, a slurry was prepared.

The prepared slurry was stacked on a platinum electrode on an insulation substrate (alumina substrate) by means of electrostatic application for applying the material on the target by electrostatic force. Then, the solvent was completely removed by using a vacuum drying oven, and consequently, an internal solid layer was formed on the internal electrode.

Next, a tetrahydrofuran solution containing 4 parts by mass of an ionic liquid ([TBMOEP$^+$][C$_1$C$_1$N$^-$]: tributyl(2-methoxyethyl)phosphonium bis(trifluoromethanesulfonyl) imide), 64 parts by mass of a plasticizer (tris(2-ethylhexyl) phosphate), and 32 parts by mass of a macromolecule (polyvinyl chloride) was applied on the internal solid layer and dried. Consequently, an electrode A including the internal solid layer and the ionic-liquid-containing membrane was obtained. The total average thickness of the internal solid layer and the ionic-liquid-containing membrane was 60 μm.

(Measurement of Albumin and γ-Globulin Solutions)

Figure 7:
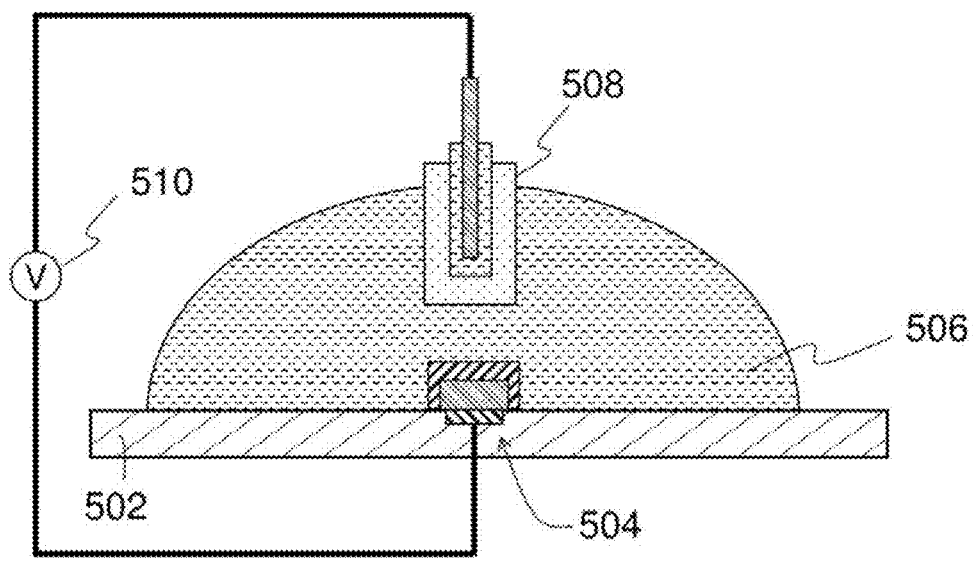
FIG. 7 is a schematic cross-sectional view regarding a method for measuring an electrode potential, in an Example.

The electrode potential of the above electrode A was measured by using a measurement system shown in FIG. 7 by using different measurement specimens. Specifically, the electrode A illustrated as an electrode 504 and a silver-silver chloride reference electrode 508 (saturated KCl, 140 mM (mmol·dm$^{-3}$) of double-junction NaCl) are connected to each other via a potentiometer 510, and each of measurement specimens 506 was dropped on an insulation substrate 502 such that the electrode A and the silver-silver chloride reference electrode were immersed in the measurement specimen 506. The open circuit potential of the electrode A relative to the potential of the silver-silver chloride reference electrode was measured for 3 minutes.

Figure 8:
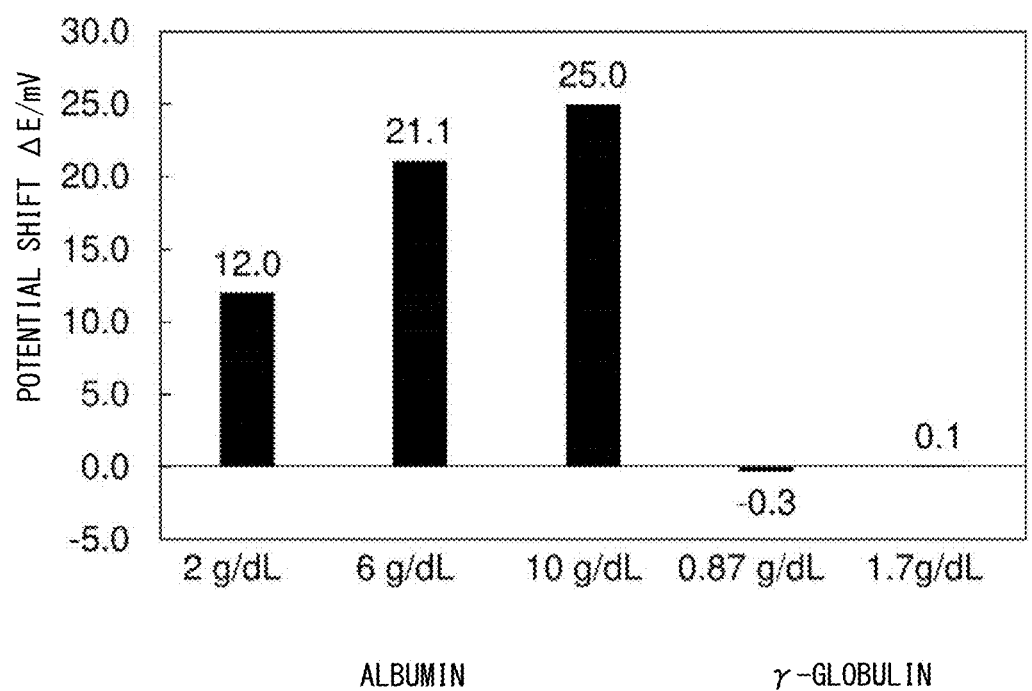
FIG. 8 shows the amounts of potential shifts in an electrode including ionic-liquid-containing membranes due to albumin or γ-globulin.

As the measurement specimen, a 140-mM NaCl solution containing albumin (bovine serum albumin) or γ-globulin (γ-globulin derived from human plasma) as a primary serum protein was used. Measurement was performed on both the solution containing the albumin or the γ-globulin and a 140-mM NaCl solution containing neither the albumin nor the γ-globulin, and a difference ($\Delta E=E-E_{base}$) between a measured potential E in the solution containing the albumin or the γ-globulin and a measured potential $E_{base}$ in the solution containing neither the albumin nor the γ-globulin was calculated. A plurality of the differences ΔE were measured with changes being made to the concentration of the albumin or the γ-globulin. The results are shown in FIG. 8. From FIG. 8, it has been found that potential shifts occur only with the measurement specimens in which the albumin is present.

Figure 9:
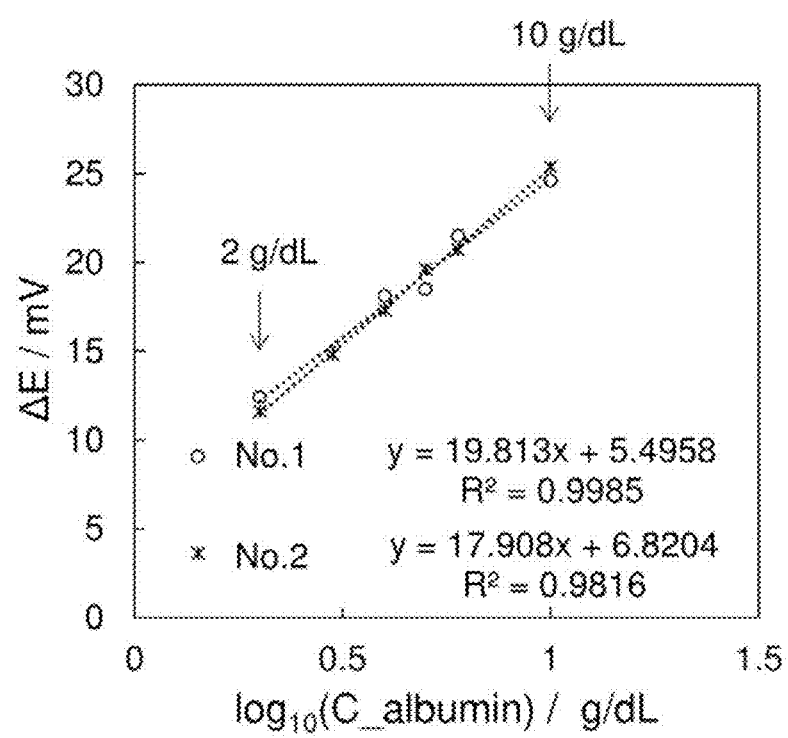
FIG. 9 shows the relationship between the concentration of albumin and the amounts of potential shifts of electrodes including ionic-liquid-containing membranes.

With this finding, two electrodes A were produced, and, for each of the two samples, the relationship between the concentration of the albumin (2 to 10 g/dL) and the potential shift ΔE was checked. The results are shown in FIG. 9. From FIG. 9, it has been found that, with high reproducibility, potential shifts occur in the electrodes A according to the concentration of the albumin.

With this finding, electrodes B, C, and D among which the type of the ionic liquid in the ionic-liquid-containing membrane and the ionic liquid content differed were further produced. The potential shift ΔE in each of the electrodes was measured by using a reference serum (JCTCM 130-4 M). In the reference serum, the concentrations of K, Na, Cl, and albumin were respectively 4.37 mM, 140.4 mM, 105.1 mM, and 3.1 g/dL, and the potential shift ΔE was calculated on the basis of a measurement result $E_{base}$ of a 140-mM NaCl solution.

The electrodes B and C were produced in the same manner as that for the electrode A, except that the ionic liquid contents were respectively set to 10% by mass and 20% by mass. The electrode D was produced in the same manner as that for the electrode A, except that: [TBMOEP$^+$][C$_2$C$_2$N$^-$] (tributyl(2-methoxyethyl)phosphonium bis(trifluoroethanesulfonyl)imide) was used as an ionic liquid; and the ionic liquid content was set to 20% by mass.

Figure 10:
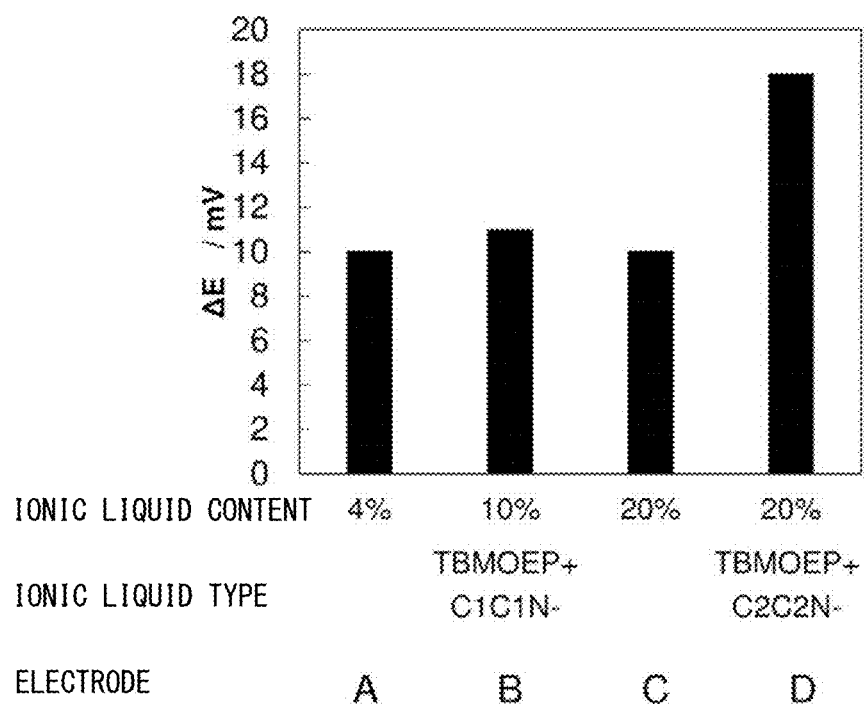
FIG. 10 shows the amounts of potential shifts having occurred according to changes in ionic liquid content and ionic liquid type.

The results are shown in FIG. 10. From FIG. 10, it has been found that potential shifts occur even if the ionic liquid content and the ionic liquid type are changed.

From the above findings, it has been found that an electrode including an ionic-liquid-containing membrane is useful as an albumin measurement electrode. In addition, it has been implied that, if an electrode including an ionic-liquid-containing membrane is used as a reference electrode at the time of measurement of an albumin-containing biological specimen, the electrode potential may vary according to the concentration of the albumin in the biological specimen.

Example 2: Examination of Performance of Solid-Type Reference Electrode Including Hydrophilic Membrane Next, a method for suppressing a potential shift, due to albumin, in an electrode including an ionic-liquid-containing membrane was examined.

(Production of Electrodes)

First, an electrode in which an internal solid layer and an ionic-liquid-containing membrane were formed on an internal electrode was produced in the same manner as that for the electrode A. Then, an aqueous solution containing 2% by mass of METOLOSE SH (the name of a product manufactured by Shin-Etsu Chemical Co., Ltd.) and 10% by mass of trehalose was dropped on the ionic-liquid-containing membrane of the electrode and dried. Consequently, an electrode E in which a water-soluble hydrophilic membrane was formed on the ionic-liquid-containing membrane was produced. In the electrode E, the side surface of the ionic-liquid-containing membrane was also coated with the hydrophilic membrane as shown in FIG. 1. The average thickness of the hydrophilic membrane was 9 μm.

Electrodes F, G, H, I, and J were produced in the same manner as that for the electrode E, except that hydrophilic membranes were formed through the following respective methods. In each of the electrodes G to I, the side surface of the ionic-liquid-containing membrane was also coated with the hydrophilic membrane as shown in FIG. 1, and the average thickness of the hydrophilic membrane was 9 μm.

Electrode F: a polyvinyl alcohol hydrogel membrane (containing 268 mM of KCl and having an average thickness of 700 μm) obtained by crosslinking with an electron beam described in Japanese Patent No. 5572016 was pressure-bonded onto the ionic-liquid-containing membrane, and the periphery of the gel was fixed with tape as shown in FIG. 2A, 2B.

Electrode G: an aqueous solution containing 2% by mass of METOLOSE SH (the name of a product manufactured by Shin-Etsu Chemical Co., Ltd.) and 30% by mass of trehalose was dropped on the ionic-liquid-containing membrane and dried.

Electrode H: an aqueous solution containing 2% by mass of METOLOSE SH (the name of a product manufactured by Shin-Etsu Chemical Co., Ltd.) and 10% by mass of xylose was dropped on the ionic-liquid-containing membrane and dried.

Electrode I: an aqueous solution containing 2% by mass of METOLOSE SM (the name of a product manufactured by Shin-Etsu Chemical Co., Ltd.) and 10% by mass of trehalose was dropped on the ionic-liquid-containing membrane and dried.

Electrode J: an aqueous solution containing 10% by mass of pullulan was dropped on an appropriate substrate and dried, to produce a pullulan membrane having an average thickness of 350 µm. The pullulan membrane was pressure-bonded onto the ionic-liquid-containing membrane, and the periphery of the pullulan membrane was fixed with tape as shown in FIG. 2A, 2B.

(Measurement of Potential Shift)

In the same measurement system as that in Example 1 shown in FIG. 7, a difference ($\Delta E = E - E_{base}$) between the measured potential E in an albumin solution and the measured potential $E_{base}$ in a buffer solution containing no albumin was calculated by using the electrode E. For the albumin solution, a buffer solution (K10 buffer) containing 10 g/dL of albumin was used. As the buffer solution (K10 buffer), a phosphoric acid buffer solution containing 10 mM of potassium ions, 140 mM of sodium ions, and 1.5 mM of phosphate ions was used.

The specific protocol is as follows. First, the albumin-containing solution was dropped on the electrode E, and the potential thereof was measured for 3 minutes. Thereafter, the electrode E was sufficiently washed by using the above buffer solution so that the hydrophilic membrane was dissolved to be completely removed. Next, the buffer solution was newly dropped on this electrode, and the potential thereof was measured for 3 minutes. Thereafter, this electrode was used to perform measurements on the buffer solution and the albumin-containing solution in this order. Before each of the measurements, the electrode was washed by using the buffer solution. The measurement protocol and the measurement results are indicated Table 1.

TABLE 1

| Measurement step | Hydrophilic membrane | Measurement solution | Measured potential (mV) | Potential shift $\Delta E$ (mV) |
| --- | --- | --- | --- | --- |
| 1 | Present | K10 buffer + 10 g/dL of albumin | 121.9 | 7.4 |
| Washed (to remove the hydrophilic membrane) | | | | |
| 2 | Absent | K10 buffer Washed | 114.5 | — |
| 3 | Absent | K10 buffer Washed | 113.6 | 25.3 |
| 4 | Absent | K10 buffer + 10 g/dL of albumin | 138.9 | |

Table 1 implies that, if an electrode has a hydrophilic membrane, the potential shift in the electrode due to albumin is suppressed. Verification measurements indicated in Table 2 and Table 3 were performed to verify that the potential shift was suppressed by the hydrophilic membrane. In the measurement performed according to a protocol indicated in Table 2, the electrode in which no hydrophilic membrane was formed (i.e., the electrode A) was used. In the measurement indicated in Table 3, influence inflicted on the measured potential by presence/absence of the hydrophilic membrane was examined. The results are indicated in Tables 2 and 3.

TABLE 2

| Measurement step | Hydrophilic membrane | Measurement solution | Measured potential (mV) | Potential shift $\Delta E$ (mV) |
| --- | --- | --- | --- | --- |
| 1 | Absent | K10 buffer Washed | 123.7 | −1.5 |
| 2 | Absent | K10 buffer Washed | 125.2 | — |

TABLE 2-continued

| Measurement step | Hydrophilic membrane | Measurement solution | Measured potential (mV) | Potential shift $\Delta E$ (mV) |
| --- | --- | --- | --- | --- |
| 3 | Absent | K10 buffer Washed | 129.5 | 30.9 |
| 4 | Absent | K10 buffer + 10 g/dL of albumin | 160.3 | |

TABLE 3

| Measurement step | Hydrophilic membrane | Measurement solution | Measured potential (mV) | Potential shift $\Delta E$ (mV) |
| --- | --- | --- | --- | --- |
| 1 | Present | K10 buffer | 128.6 | −0.6 |
| Washed (to remove the hydrophilic membrane) | | | | |
| 2 | Absent | K10 buffer | 129.2 | |

From the results indicated in Tables 1 to 3, it has been confirmed that, if an electrode including an ionic-liquid-containing membrane has a hydrophilic membrane disposed on the ionic-liquid-containing membrane, the potential shift in the electrode due to albumin is suppressed. Therefore, it has been found that an electrode including an ionic-liquid-containing membrane and a hydrophilic membrane can be used as a reference electrode that has a stable electrode potential even at the time of measurement of a biological specimen.

Next, measurements of potential shifts were performed by using the electrodes A and F to J instead of the electrode E. In addition, measurement of a potential shift was performed by using, as a Reference Example, a silver-silver chloride reference electrode instead of the electrode E.

The specific protocol is as follows. First, an albumin-containing solution was dropped on each of the electrodes, and the potential thereof was measured for 3 minutes. Thereafter, the electrode was sufficiently washed by using a buffer solution (K1 buffer) so that the hydrophilic membrane was dissolved to be completely removed. As the buffer solution (K1 buffer), a phosphoric acid buffer solution containing 1 mM of potassium ions, 140 mM of sodium ions, and 1.5 mM of phosphate ions was used. As for the electrode F, washing was performed after the hydrophilic membrane having been pressure-bonded was physically removed therefrom. Next, as for the silver-silver chloride reference electrode, only washing was performed. Then, the buffer solution was newly dropped on this electrode, and the potential thereof was measured for 3 minutes. The measurement specimens were the same 10-g/dL albumin-containing buffer solution and the same buffer solution as those described above. As for only the electrode J, the measurement time of the potential thereof was 10 minutes.

Figure 11:
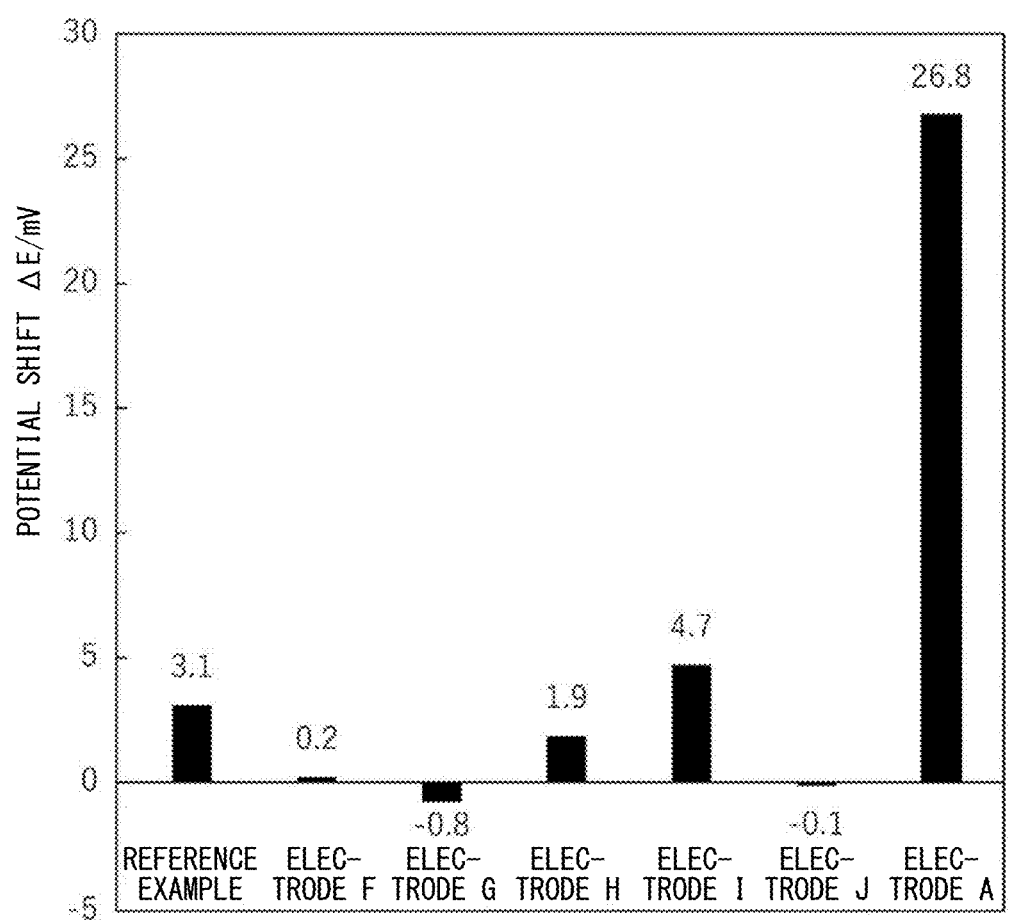
FIG. 11 shows a potential shift ΔE which is the difference between a measured potential E in an albumin solution and a measured potential $E_{base}$ in a buffer solution containing no albumin, in each of electrodes.

The potential shifts $\Delta E$ in measurements of the respective electrodes are shown in FIG. 11. According to FIG. 11, the electrodes F to J each of which was an electrode including the hydrophilic membrane on the ionic-liquid-containing membrane experienced potential shifts $\Delta E$ approximately equal to or smaller than the potential shift experienced by the silver-silver chloride reference electrode as the Reference Example. Meanwhile, only the electrode A including no hydrophilic membrane experienced a large potential shift $\Delta E$.

Judging from the above results, it has been found that an electrode including an ionic-liquid-containing membrane and a hydrophilic membrane disposed on the ionic-liquid-containing membrane can be suitably used as a reference electrode that has a stable electrode potential even at the time of measurement of a biological specimen.

Example 3: Examination of Performance of Ion Sensor

Next, the performance of an ion sensor having the above electrode including the ionic-liquid-containing membrane and the hydrophilic membrane disposed on the ionic-liquid-containing membrane was examined.
(Manufacturing of Ion Sensors)

Sensors (such as one shown in FIGS. 5A and 5B) in each of which a potassium ion-selective electrode and a reference electrode were disposed on an insulation substrate were manufactured. Specifically, two sensors in each of which the above electrode J was used as the reference electrode were manufactured as samples for Examples, and two sensors in each of which the above electrode A was used as the reference electrode were manufactured as samples for Comparative Examples.

The potassium ion-selective electrode was produced as follows. An internal solid layer was formed on a platinum electrode which was an internal electrode in the same manner as that for the above electrode A. Then, a tetrahydrofuran solution containing 3 parts by mass of an ionophore (valinomycin), 67.9 parts by mass of a plasticizer (tris(2-ethylhexyl)phosphate), 0.3 parts by mass of an anion scavenger (potassium tetrakis(4-chlorophenyl)borate), and 28.8 parts by mass of a binder resin (polyvinyl chloride) was applied on the internal solid layer and dried. Consequently, a potassium ion-selective membrane coating the internal solid layer was formed. The average thickness of the potassium ion-selective electrode was 60 μm.
(Measurement of Reference Serum)

Figure 12:
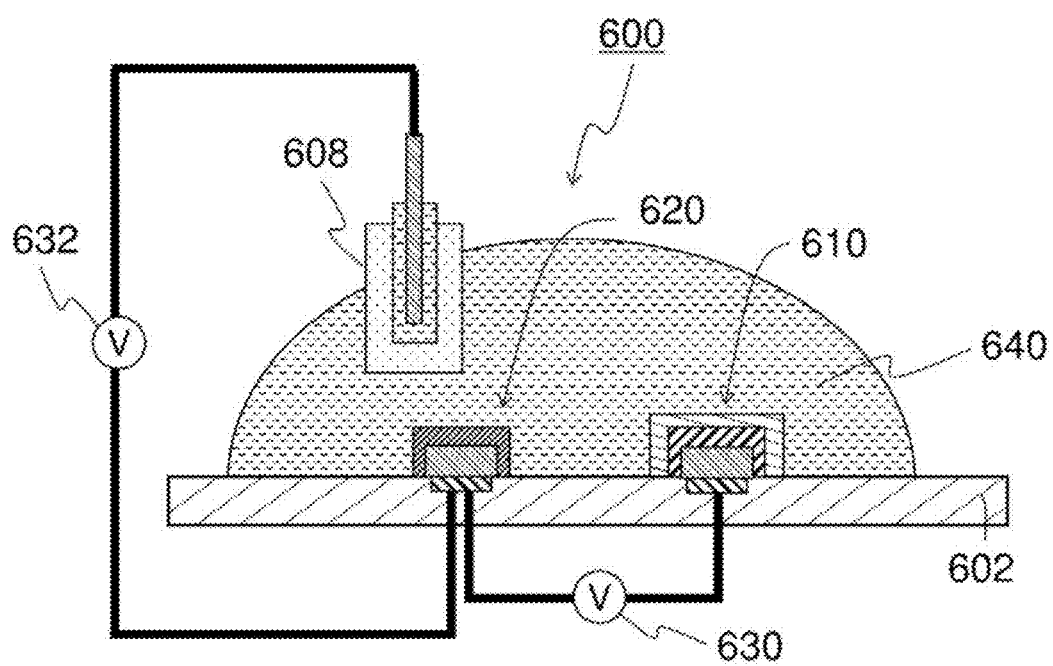
FIG. 12 shows a measurement system.

The performance of the potassium ion sensor in each of the Examples and the Comparative Examples was evaluated by using a measurement system shown in FIG. 12. Specifically, a measurement specimen 640 was dropped on a sensor (potassium ion sensor) 600 in which a first electrode (reference electrode) 610 and a second electrode (potassium ion-selective electrode) 620 were disposed on an insulation substrate 602. The first electrode (reference electrode) 610 and the second electrode (potassium ion-selective electrode) 620 were connected to each other via a potentiometer 630, and the second electrode (potassium ion-selective electrode) 620 and a silver-silver chloride reference electrode 608 (saturated KCl, 140 mM (mmol·dm$^{-3}$) of double-junction NaCl) immersed in the measurement specimen 640 were connected to each other via a potentiometer 632.

The specific protocol is as follows. First, a reference serum (JCTCM 130-4 M) was dropped as the measurement specimen 640. Then, an electrode potential E of the second electrode (potassium ion-selective electrode) 620 relative to an electrode potential of the first electrode (reference electrode) 610 was measured, and an electrode potential $E_{ref}$ of the second electrode (potassium ion-selective electrode) 620 relative to an electrode potential of the silver-silver chloride reference electrode 608 was measured for 3 minutes. Next, the sensor was washed by using the above buffer solution (K1 buffer). Then, the same measurement was performed with the buffer solution (K1 buffer). That is, with the buffer solution (K1 buffer), the electrode potential $E_{base}$ of the second electrode (potassium ion-selective electrode) 620 relative to the electrode potential of the first electrode (reference electrode) 610, and the electrode potential $E_{ref\_base}$ of the second electrode (potassium ion-selective electrode) 620 relative to the electrode potential of the silver-silver chloride reference electrode 608, were measured. Thereafter, potential differences ($\Delta E = E - E_{base}$ and $\Delta E_{ref} = E_{ref} - E_{ref\_base}$) were calculated. In the reference serum, the concentrations of K, Na, Cl, and albumin were respectively 4.37 mM, 140.4 mM, 105.1 mM, and 3.1 g/dL.

Figure 13:
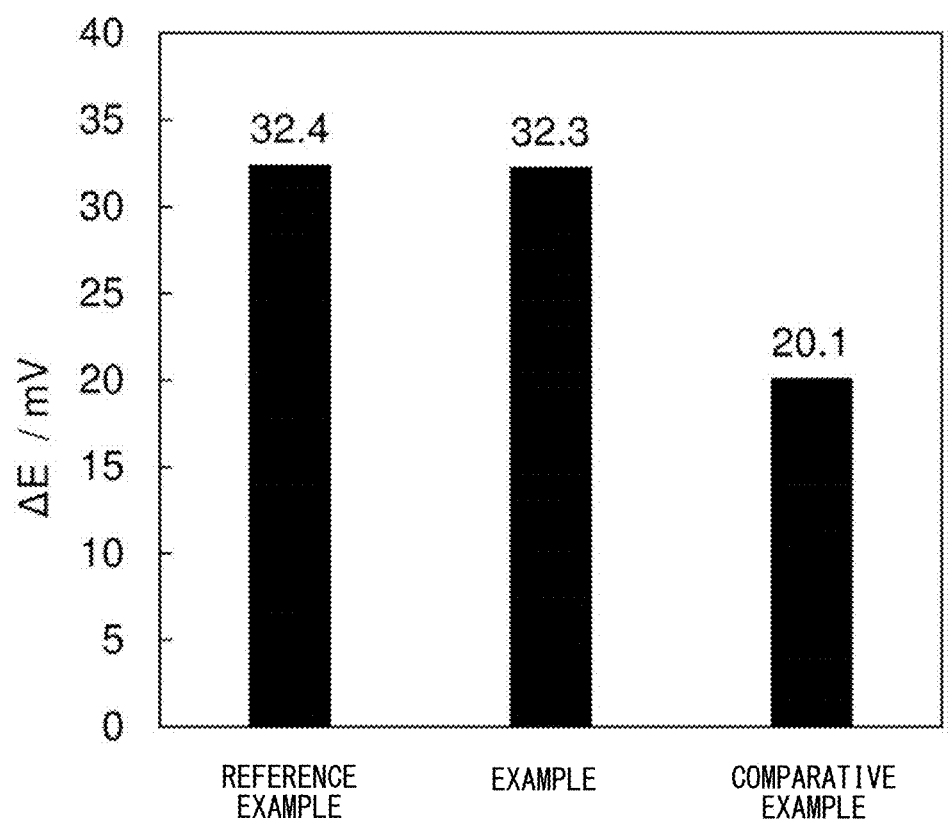
FIG. 13 shows measurement results, regarding a reference serum, obtained by potassium ion sensors.

The above measurement was performed on the two sensors as the Examples and the two sensors as the Comparative Examples having been manufactured. An average value of the potential differences ΔE in the sensors as the Examples was calculated, and an average value of the potential differences ΔE in the sensors as the Comparative Examples was calculated. In addition, an average value of the potential differences $\Delta E_{ref}$ in the total of four sensors was calculated. FIG. 13 shows: the average value of the potential differences ΔE in the sensors as the Examples; the average value of the potential differences ΔE in the sensors as the Comparative Examples; and the average value of the potential differences $\Delta E_{ref}$ in the total of four sensors.

Regarding the sensors as the Examples in each of which the reference electrode including not only the ionic-liquid-containing membrane but also the hydrophilic membrane was used, a measurement result equivalent to the result of a Reference Example in which a silver-silver chloride reference electrode conventionally used in clinical measurement was used was obtained. Meanwhile, regarding the sensors as the Comparative Examples in each of which the reference electrode including no hydrophilic membrane was used, the measurement result significantly differed from that of the sensor as the Reference Example. The above results imply that the sensor having the reference electrode according to either of the above embodiments including the hydrophilic membrane on the ionic-liquid-containing membrane provides a stable potential even at the time of measurement of a biological specimen.

Example 4: Measurement of Biological Specimen by Albumin Sensor (Manufacturing of Albumin Sensor)

Three sensors in each of which an albumin measurement electrode and a reference electrode were disposed on an insulation substrate were manufactured as samples. The electrode A and the electrode J were produced to be adjacent to each other on an alumina substrate in the same manner as that described above.
(Creation of Calibration Curve)

Figure 14:
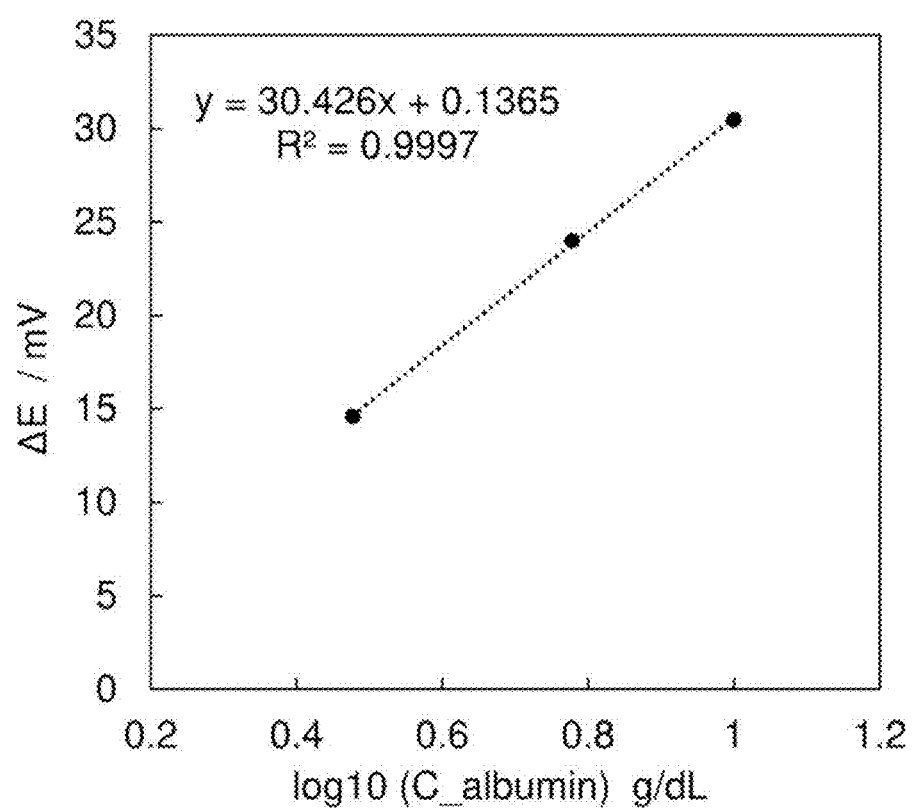
FIG. 14 shows a calibration curve created by using albumin sensors.

A potential E in an albumin-containing phosphoric acid buffer solution was measured by using each of the manufactured sensors. Then, the sensor was washed by using a phosphoric acid buffer solution. Thereafter, the same measurement was performed also with the phosphoric acid buffer solution, and a potential $E_{base}$ in the phosphoric acid buffer solution was measured. Thereafter, a potential difference ΔE ($\Delta E = E - E_{base}$) was calculated. With changes being made to the concentration of the albumin in the specimen being measured, the measurement was performed a total of 3 times. Then, plotting was performed regarding the relationship between the concentration of the albumin and the potential difference ΔE, whereby a calibration curve was created. The created calibration curve is shown in FIG. 14. From this result, it has been found that a sensor that has, as a working electrode, an electrode including an ionic-liquid-containing membrane and that has, as a reference electrode, an electrode including an ionic-liquid-containing membrane and a hydrophilic membrane can be used as an albumin sensor.

Example 5: Measurement of Biological Specimen by pH Sensor

An albumin-containing solution was measured by using a commercially available pH meter including an internal-solution-type reference electrode in order to verify that a hydrophilic membrane suppresses a potential shift due to albumin, not only in a solid-type electrode including an ionic-liquid-containing membrane but also in an internal-solution-type electrode including an ionic-liquid-containing membrane.

(Preparation and Manufacturing of pH Meters)

As a Comparative Example, a commercially available pH meter (PUREIL, the name of a product manufactured by HORIBA, Ltd.) including a glass pH electrode and a silver-silver chloride reference electrode in which an ionic-liquid-containing membrane was provided to a liquid junction, was prepared. In addition, a polyvinyl alcohol hydrogel membrane produced in the same manner as that for the electrode F was pressure-bonded onto the ionic-liquid-containing membrane provided to the liquid junction in such a pH meter and fixed with tape, whereby a pH meter as an Example was manufactured. In addition, as Reference Example 1, a commercially available pH meter including a glass pH electrode and a silver-silver chloride reference electrode including no ionic-liquid-containing membrane was prepared. As Reference Example 2, a commercially available pH meter including the silver-silver chloride reference electrode and a glass membrane pH electrode was prepared.

(Measurement of pH of Albumin Solution)

The pH meters as the Example, the Comparative Example, the Reference Example 1, and the Reference Example 2 manufactured as described above were used to perform measurement on solutions in which albumin was added in various concentrations (3 g/dL, 6 g/dL, and 10 g/dL) to a buffer solution having a pH of 7.4. For a method for the measurement, manuals that came with the respective pH meters were referred to. The results are shown in FIG. 15.

Figure 15:
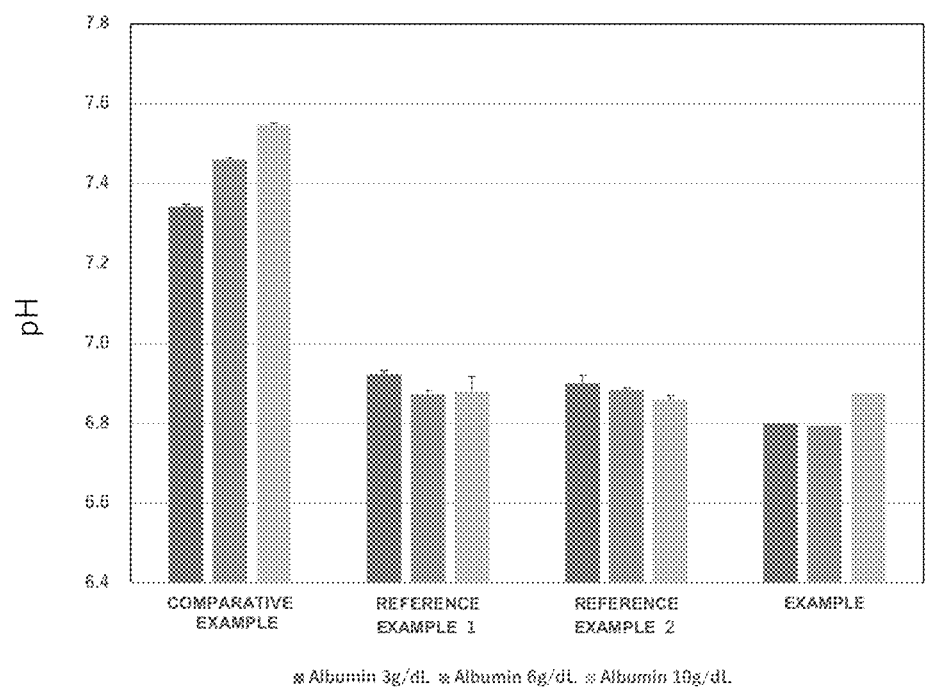
FIG. 15 shows measurement results, regarding albumin-containing solutions, obtained by pH meters.

According to FIG. 15, with the reference electrode of the Comparative Example in which the ionic-liquid-containing membrane was provided to the liquid junction, the measurement result significantly varied according to the concentration of the albumin. Thus, it is implied that no correct pH was able to be measured owing to influence of the albumin. Meanwhile, each of the pH meter as the Example in which the hydrophilic membrane was disposed on the ionic-liquid-containing membrane and the pH meters as the Reference Examples 1 and 2 including no ionic-liquid-containing membranes read about 6.8 as a pH regardless of the concentration of the albumin. Thus, it is implied that a hydrophilic membrane suppresses a potential shift due to albumin, not only in a solid-type electrode including an ionic-liquid-containing membrane but also in an internal-solution-type electrode including an ionic-liquid-containing membrane.

Example 6: Electrode Including Hydrophilic Membrane Having Multi-Layer Structure Electrodes K and L were produced in the same manner as that for the electrode E, except that hydrophilic membranes were formed through the following respective methods. In the electrodes K and L, the average thicknesses of the hydrophilic membranes were respectively about 10 μm and about 20 μm.

Electrode K: an aqueous solution containing 10% by mass of pullulan and 3% by mass of glycerol was dropped on the ionic-liquid-containing membrane and dried. Further, an 80%-by-mass ethanol solution containing 5% by mass of METOLOSE SH (the name of a product manufactured by Shin-Etsu Chemical Co., Ltd.) and 1.5% by mass of glycerol was dropped on the pullulan membrane and dried.

Electrode L: an aqueous solution containing 10% by mass of pullulan and 3% by mass of glycerol was dropped on the ionic-liquid-containing membrane and dried. Further, an 80%-by-mass ethanol solution containing 5% by mass of METOLOSE SH (the name of a product manufactured by Shin-Etsu Chemical Co., Ltd.) and 1.5% by mass of glycerol was dropped on the pullulan membrane and dried. Further, an aqueous solution containing 10% by mass of pullulan and 3% by mass of glycerol was dropped on the METOLOSE membrane and dried.

The above electrodes K and L are also electrodes that each allow suppression of a potential shift due to albumin as in the electrodes E to J, and can each be suitably used as a reference electrode that has a stable electrode potential even at the time of measurement of a biological specimen.

What is claimed is:

1. A sensor comprising an insulation substrate, a first electrode and a second electrode disposed on the insulation substrate,
  Wherein
    the first electrode comprises:
      a first internal electrode;
      a first internal solid layer disposed on the first internal electrode;
      an ionic-liquid-containing membrane disposed on the first internal solid layer; and
      a hydrophilic membrane disposed on the ionic-liquid-containing membrane,
    the first internal electrode comprises a multi-layer structure including two or more layers that have compositions different from one another,
    the ionic-liquid-containing membrane comprises a multi-layer structure including two or more layers that have compositions different from one another,
    the second electrode comprises:
      a second internal electrode;
      a second internal solid layer disposed on the second internal electrode; and
      an ion-selective membrane disposed on the second internal solid layer,
    the second internal electrode comprises a multi-layer structure including two or more layers that have compositions different from one another, and
    the ion-selective membrane comprises a multi-layer structure including two or more layers that have compositions different from one another.

2. The sensor of claim 1, wherein the hydrophilic membrane contains a hydrophilic macromolecule.

3. The sensor of claim 2, wherein the hydrophilic macromolecule contains at least one type selected from the group consisting of a polysaccharide and a crosslinked product thereof.

4. The sensor of claim 3, wherein the polysaccharide is selected from the group consisting of pullulan, cellulose, pectin, acarbose, amylopectin, inulin, chitin, chitosan, beta-glucan, glycogen, a-cyclodextrin, B-cyclodextrin, y-cyclodextrin, stachyose, dextran, dextrin, maltotriose, mannan, melezitose, raffinose, levan, and derivatives thereof.

5. The sensor of claim 2, wherein the hydrophilic macromolecule comprises:
(a) at least one polymer selected from the group consisting of: polyvinyl alcohol, polyethylene oxide, sodium polyacrylate, and polymethyl methacrylate;
(b) at least one polymer selected from the group consisting of: polymers each containing a monomer unit derived from acrylamide, 2-methacryloyloxyethyl phosphorylcholine, or myristyl alcohol; or
(c) a derivative of or a crosslinked product of any of the polymers recited in (a) or (b).

6. The sensor of claim 2, wherein the hydrophilic macromolecule is water-soluble.

7. The sensor of claim 1, wherein the hydrophilic membrane has an average thickness of not smaller than 1 μm and not larger than 1000 μm.

8. The sensor of claim 1, wherein the hydrophilic membrane comprises two or more layers having different compositions.

9. The sensor of claim 1, wherein the ionic-liquid-containing membrane is a gel membrane containing an ionic liquid.

10. The sensor of claim 1, wherein the first internal solid layer contains an insertion material and an ion-conductive ceramic.

11. The sensor of claim 10, wherein the insertion material is a metal oxide, an oxygen redox material, or a Prussian blue analogue.

12. The sensor of claim 11, wherein the metal oxide is $MxMnO_2$, wherein M represents Na or K, and x represents any positive number.

13. The sensor of claim 10, wherein the ion-conductive ceramic is a $\beta''$-alumina or a $\beta$-alumina.

14. The sensor of claim 1, the sensor being configured to measure an electrode potential of the second electrode relative to an electrode potential of the first electrode.

15. The sensor of claim 1, wherein
the first internal electrode and the second internal electrode are substantially same between the first electrode and the second electrode, and
the first internal solid layer and the second internal solid layer are substantially same between the first electrode and the second electrode.

16. The sensor according to claim 1, wherein the first electrode and the second electrode are further configured to detect or measure albumin inside a specimen solution.

17. The sensor according to claim 1, wherein the first internal solid layer comprises a multi-layer structure including two or more layers that have compositions different from one another.

18. The sensor according to claim 1, wherein the hydrophilic membrane comprises a multi-layer structure including two or more layers that have compositions different from one another.

19. The sensor according to claim 1, wherein the second internal solid layer comprises a multi-layer structure including two or more layers that have compositions different from one another.

* * * * *